(12) United States Patent
Glasgow

(10) Patent No.: US 11,602,751 B2
(45) Date of Patent: Mar. 14, 2023

(54) LIQUID EVALUATION

(71) Applicant: Forward Biotech, Inc., Averill Park, NY (US)

(72) Inventor: Ian K. Glasgow, Averill Park, NY (US)

(73) Assignee: Forward Biotech, Inc., Troy, NY (US)

(*) Notice: Subject to any disclaimer, the term of this patent is extended or adjusted under 35 U.S.C. 154(b) by 122 days.

(21) Appl. No.: 16/497,650

(22) PCT Filed: Mar. 30, 2018

(86) PCT No.: PCT/US2018/025472
§ 371 (c)(1),
(2) Date: Sep. 25, 2019

(87) PCT Pub. No.: WO2018/183896
PCT Pub. Date: Oct. 4, 2018

(65) Prior Publication Data
US 2020/0023357 A1 Jan. 23, 2020

Related U.S. Application Data

(60) Provisional application No. 62/479,513, filed on Mar. 31, 2017.

(51) Int. Cl.
*B01L 3/00* (2006.01)

(52) U.S. Cl.
CPC ... *B01L 3/50857* (2013.01); *B01L 2200/0605* (2013.01); *B01L 2300/024* (2013.01);
(Continued)

(58) Field of Classification Search
CPC .......... B01L 3/50857; B01L 2300/024; B01L 2300/0663; B01L 2300/161;
(Continued)

(56) References Cited

U.S. PATENT DOCUMENTS 5,192,502 A * 3/1993 Attridge ............. G01N 21/6428
356/417
6,193,647 B1 2/2001 Beebe et al.
(Continued)

FOREIGN PATENT DOCUMENTS

CN 101187580 A 5/2008
CN 103402641 A 11/2013
(Continued)

OTHER PUBLICATIONS

Goodman, Marco, EP Application No. 18719006.1-1101, Office Action 1, dated Nov. 23, 2020, 5 pages.
(Continued)

*Primary Examiner* — Matthew D Krcha
*Assistant Examiner* — Sophia Y Lyle
(74) *Attorney, Agent, or Firm* — LaBatt, LLC

(57) ABSTRACT

A liquid evaluation system can include a cartridge including a channel configured to pull a liquid into the channel by capillary action. The cartridge can include a first plate and a second plate located in close proximity to the first plate. An internal facing surface of each plate can include a corresponding region forming the channel. Each of the regions can have an affinity for the liquid. The close proximity of the plates and the regions having an affinity for the liquid cause the liquid to be pulled into the channel by capillary action. The cartridge can include one or more additional attributes and/or the system can include one or more additional components for performing the evaluation.

20 Claims, 13 Drawing Sheets

(52) U.S. Cl.
CPC . *B01L 2300/0663* (2013.01); *B01L 2300/161* (2013.01); *B01L 2400/0406* (2013.01)

(58) Field of Classification Search
CPC ....... B01L 2400/0406; B01L 2300/028; B01L 2300/0809; B01L 2200/148; B01L 2200/0605; B01L 2200/143; G01F 25/0092; G01F 25/0007; G01F 13/00; G01B 13/00
See application file for complete search history.

(56) References Cited

U.S. PATENT DOCUMENTS

| | | | |
|---|---|---|---|
| 7,189,580 B2 | 3/2007 | Beebe et al. | |
| 8,091,405 B2 | 1/2012 | Schmid et al. | |
| 10,450,542 B2 | 10/2019 | Vulto et al. | |
| 2001/0051113 A1 | 12/2001 | Juncosa et al. | |
| 2003/0121788 A1* | 7/2003 | Gascoyne | B01L 3/50273 137/806 |
| 2004/0067166 A1* | 4/2004 | Karinka | B01L 3/502723 422/82.03 |
| 2005/0019224 A1* | 1/2005 | Pechter | B01F 25/14 506/13 |
| 2005/0019231 A1* | 1/2005 | Kahl | G02B 21/34 422/187 |
| 2005/0229722 A1* | 10/2005 | Howell | A61B 5/150343 73/864.72 |
| 2008/0066523 A1* | 3/2008 | Schmid | G01F 25/0092 73/1.74 |
| 2008/0257754 A1 | 10/2008 | Pugia et al. | |
| 2010/0045147 A1 | 2/2010 | Harnack et al. | |
| 2010/0254858 A1 | 10/2010 | Paulraj et al. | |
| 2011/0053289 A1 | 3/2011 | Lowe et al. | |
| 2011/0056287 A1 | 3/2011 | Schardt et al. | |
| 2012/0004140 A1 | 1/2012 | Staker | |
| 2012/0184464 A1* | 7/2012 | Lee | B01L 3/502784 506/17 |
| 2013/0121877 A1* | 5/2013 | Ono | B01L 3/5027 422/68.1 |
| 2016/0231163 A1* | 8/2016 | Van 't Oever | G01B 13/00 |
| 2017/0045504 A1 | 2/2017 | Blom et al. | |

FOREIGN PATENT DOCUMENTS

| | | | | |
|---|---|---|---|---|
| EP | 0321736 | A2 | 6/1989 | |
| EP | 2213364 | A1 | 8/2010 | |
| EP | 2374540 | A2 | 10/2011 | |
| EP | 3072594 | A1 | 3/2015 | |
| EP | 3072594 | A1 * | 9/2016 | .............. B01L 3/021 |
| EP | 3130401 | A1 | 2/2017 | |
| GB | 2275428 | A * | 8/1994 | ......... G01N 30/6095 |
| GB | 2275428 | A | 8/1994 | |
| JP | 2013156271 | A * | 8/2013 | ........... G01N 21/645 |
| WO | 2007050013 | A1 | 5/2007 | |
| WO | 2015099532 | A1 | 7/2015 | |
| WO | 2016195480 | A1 | 12/2016 | |
| WO | 2018183896 | A1 | 10/2018 | |

OTHER PUBLICATIONS

Kim, Y., International Application No. PCT/US2018/025472, International Search Report and Written Opinion, dated Jun. 14, 2018, 15 pages.

Peschier, Yvonne, International Application No. PCT/US2020/014341, International Search Report and Written Opinion, dated May 25, 2020, 11 pages.

Chinese Application No. 201880028976.6, Office Action 1, dated Mar. 26, 2021, 10 pages (english summary).

Chinese Application No. 201880028976.6, Office Action 2, dated Nov. 22, 2021, 18 pages (including automated English language translation).

Chinese Application No. 201880028976.6, Notice of Grant, dated Feb. 28, 2022, 2 pages (No English translation).

* cited by examiner

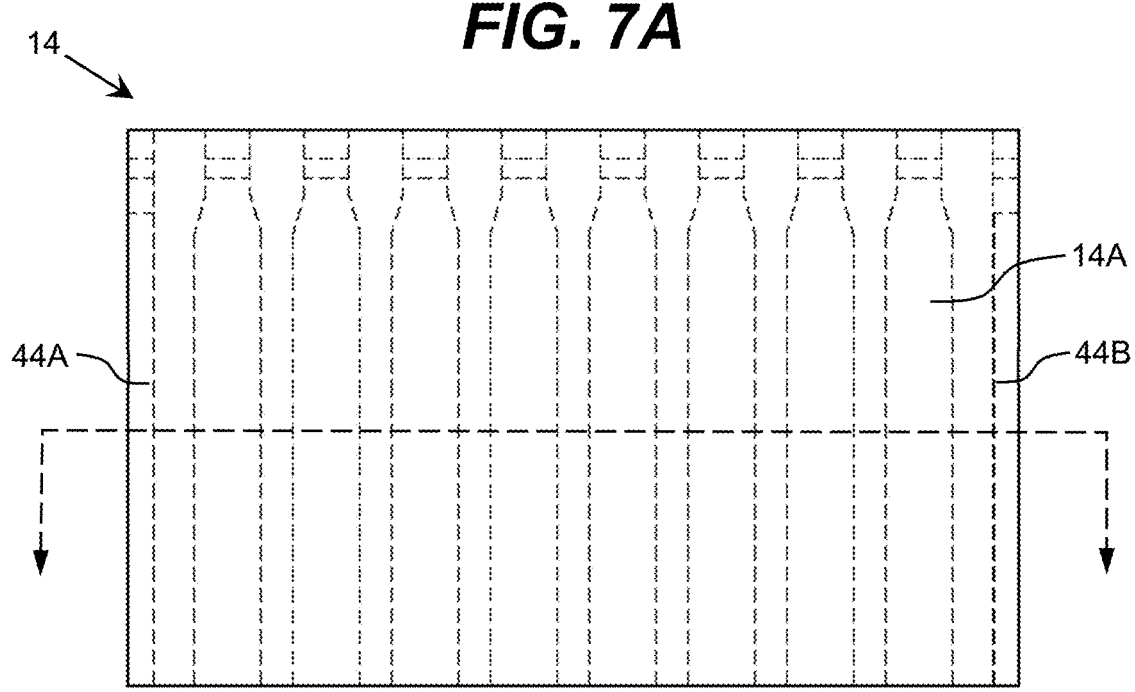
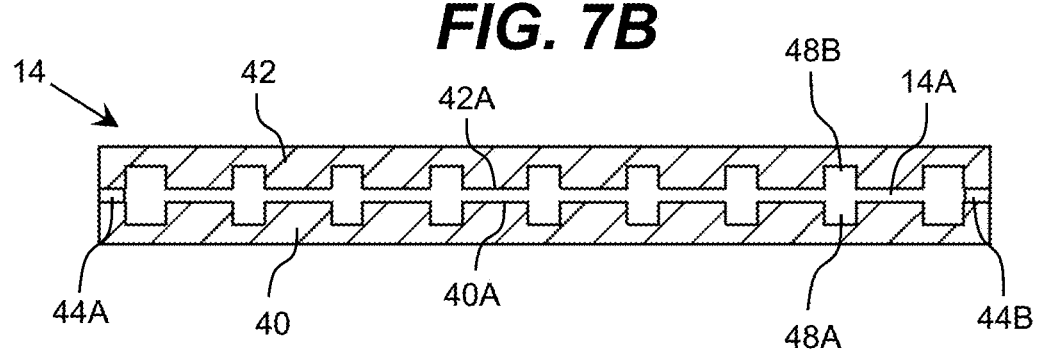

DETAIL A

SECTION B-B

LIQUID EVALUATION

REFERENCE TO RELATED APPLICATIONS

The current application is a U.S. National Stage of International Application No. PCT/US2018/025472, filed on 30 Mar. 2018, which claims the benefit of U.S. Provisional Application No. 62/479,513, filed on 31 Mar. 2017, each of which is hereby incorporated by reference.

TECHNICAL FIELD

The disclosure relates generally to evaluation of a dispensed liquid, and more particularly, to a liquid evaluation solution that uses one or more channels in a cartridge.

BACKGROUND ART

Liquid handling systems are an essential tool and are used extensively in laboratories used for biology, chemistry, and other fields. A commonly utilized example of a liquid handling system is a pipette. The pipette is used to transfer an accurate volume of liquid from one container to another, e.g., for assays, chemical reactions, and other purposes. A pipette typically includes a piston placed on the end of the pipette, which displaces air. The piston can be operated to reduce air pressure above liquid to suck the liquid into a pipette tip, or increase air pressure to force the liquid out of the pipette tip.

Pipettes are used with volumes ranging over several orders of magnitude, from about 1 microliter to over 1 milliliter. Fixed volume pipettes are used for a single volume. Adjustable pipettes handle a range of volumes, typically on the order of a single order of magnitude. Therefore, a laboratory often has multiple pipettes to cover a range of volumes.

With use or misuse, pipettes can fall out of calibration. Routine calibration of pipettes is common, and even required in many applications. For example, international standards, such as ISO 8655, regulate the required accuracy and repeatability of pipettes.

The most common existing approach for determining the accuracy of a liquid handling device, such as a pipette, and/or a corresponding system including the liquid handling device, uses a balance to measure the mass of the dispensed liquid. The liquid's mass is then converted to volume based upon a known density of the liquid at a measured temperature of the liquid. Commonly, distilled water is used for this purpose. Evaporation must be considered as a source of error in this measurement. In addition, the balance must be very sensitive. For example, to accurately measure microliter volumes of liquid to better than 1%, the balance must be more accurate than 10 micrograms.

Balances this accurate are expensive and not common. Additionally, these balances are subject to errors from air currents across the pan, vibrations, and evaporation. Controlling evaporation to negligible levels is very difficult, especially considering the relatively large amount of surface exposed to air relative to the volume of the dispensed liquid. In addition, this is not a direct measurement of volume. Rather, a mass measurement must be converted to volume using additional measurements. An additional measurement of the liquid's density, or its temperature which can be converted to density, reduces the accuracy of the measurement method.

An alternative approach for measuring liquid handling device accuracy uses a colorimetric measurement. In this approach, the liquid handling device is used to dispense a volume of a liquid dye in which the color is very accurately controlled, into a well with a known volume of liquid, and a change in color is measured. As a result, this approach also does not measure liquid volume directly. The measured change in color must be combined with additional measurements, in order to deduce the dispensed volume. The accuracy of this approach also suffers from the need for multiple measurements. Additionally, similar to the previously described approach, this approach also requires expensive equipment, mathematics, and must be performed where the equipment is located.

A more effective approach uses a cartridge for evaluating the volume of a liquid. In this approach, the cartridge can have one or more well tabs that pivot into a position in which liquid dispensed into a corresponding well is placed in contact with a capillary. Surface tension draws the liquid from the well into the capillary. Comparison of the liquid-air interface with markings on or near the capillary, can reveal the volume of liquid dispensed.

In many applications, it is desirable to transfer multiple liquid volumes simultaneously. For example, this is often the case when working with well plates. In response, multichannel liquid handling devices have been developed. For example, multichannel pipettes exist, often with 8, 12, or 16 channels. Likewise, other multichannel liquid handling systems, including robotic systems, often dispense multiple volumes of liquids simultaneously. The accuracy of the liquid volume dispensed from each channel using each of these multichannel liquid handling devices also requires checking and calibration. Naturally, checking the accuracy and calibrating multichannel liquid handling devices is much more tedious and difficult than doing such for single channel liquid handling devices.

To date, to determine the accuracy of a multichannel liquid handling device, liquid volumes dispensed from each channel must be separately measured, such as gravimetrically with a balance.

SUMMARY OF THE INVENTION

The inventors recognize that the current approaches for determining the accuracy of a multichannel liquid handling device, such as a multichannel pipette, are quite tedious, expensive, and require multiple measurements, each of which potentially introduces error into the measurement process.

Aspects of the invention can provide a direct volumetric measurement solution for determining the accuracy of a liquid handling device using one or more channels of liquid dispensed by the liquid handling device. In an embodiment, a multichannel liquid handling device (e.g., a multichannel pipette) can dispense liquid into multiple channels for concurrent evaluation of each channel of the liquid handling device. The solution can be more easily implemented, without requiring the purchase of additional expensive equipment. An embodiment of the invention does not require the user to perform any calculations to determine the accuracy of the liquid dispensing system to a high degree of certainty.

Commonly utilized indirect measurement approaches are affected by evaporation. Embodiments of the invention described herein significantly reduce evaporation effects during evaluation of a liquid, e.g., to a negligible level.

Additionally, the commonly utilized indirect measurement approaches require expensive equipment, while embodiments of the invention described herein can be a low cost device not requiring expensive instrumentation. Furthermore, an embodiment of the invention can be small and portable, enabling the user to evaluate a liquid where the user is located.

An embodiment of the invention also can provide a more accurate measurement of a volume of the liquid than indirect measurement approaches, particularly for smaller liquid volumes. In fact, an embodiment of the invention can provide increased advantages over the prior indirect measurement approaches as the liquid volume to be measured decreases.

Still further, an embodiment of the invention can provide results in seconds, while the indirect measurement approaches require minutes to tens of minutes.

Furthermore, an embodiment of the invention described herein can acquire data for determining the volume of multiple liquid aliquots concurrently, while the existing indirect measurement approaches, such as a balance or a colorimetric device, must analyze liquid volumes one at a time.

Aspects of the invention provide a liquid evaluation system. The system can include a cartridge including a channel configured to pull a liquid into the channel by capillary action. The cartridge can include a first plate and a second plate located in close proximity to the first plate. An internal facing surface of each plate can include a corresponding region forming the channel. Each of the regions can have an affinity for the liquid. The close proximity of the plates and the regions having an affinity for the liquid cause the liquid to be pulled into the channel by capillary action. The cartridge can include one or more additional attributes and/or the system can include one or more additional components for performing the evaluation.

A first aspect of the invention provides a liquid evaluation system comprising: a cartridge including a channel for holding liquid, the cartridge including: a first plate including a first region of an internal facing surface forming a first side of the channel; and a second plate including a second region of an internal facing surface forming a second side of the channel, wherein the first region and the second region have an affinity for the liquid, and wherein a separation between the first plate and the second plate causes the liquid to be pulled into the channel by capillary action, wherein the first plate and the second plate form an entrance region for the channel, and wherein the entrance region has a larger depth than a depth for the channel at an entrance of the channel.

A second aspect of the invention provides a multichannel cartridge including a plurality of channels for holding liquid, the cartridge including, for each of the plurality of channels: a first structure including a first region of an internal facing surface forming a first side of the channel; and a second structure including a second region of an internal facing surface forming a second side of the channel, wherein the first region and the second region have an affinity for the liquid, and wherein a separation between the first structure and the second structure causes the liquid to be pulled into the channel by capillary action, wherein the first structure and the second structure form an entrance region for the channel, and wherein the entrance region has a larger depth than a depth for the channel at an entrance of the channel.

A third aspect of the invention provides a cartridge including a channel for holding liquid, the cartridge including: a first plate including a first region of an internal facing surface forming a first side of the channel; and a second plate including a second region of an internal facing surface forming a second side of the channel, wherein the first region and the second region have an affinity for the liquid, wherein a separation between the first plate and the second plate causes the liquid to be pulled into the channel by capillary action, and wherein the channel includes a depth that varies along a length of the channel.

A liquid evaluation system described herein can include a cartridge including one or more channels for holding a liquid. Embodiments of the system can further include a stand for use in positioning the cartridge in a desired orientation for dispensing the liquid into the channel. An embodiment of the stand can include one or more mechanical guides for aligning a liquid dispensing channel of a liquid handling device with an entrance region for the channel. Embodiments of the system also can include an imaging device for acquiring image data of one or more channels for use in an evaluation and/or a computer system for storing data relating to the evaluation, determining one or more measurements for the evaluation, and/or performing the evaluation.

An embodiment of a cartridge can include one or more channels, each with opposing sides formed by a pair of structures with a separation that causes the liquid to be pulled into the channel by capillary action. An internal facing surface of each structure can include one or more regions that have an affinity for the liquid, each of which corresponds to a channel. The cartridge can include an entrance region for each channel, which has a larger depth than a depth for the channel at an entrance of the channel. The entrance region also can have an affinity for the liquid. Each structure can be fabricated of a material having an affinity for the liquid. Each structure can include a coating having an affinity for the liquid in the region corresponding to the channel and/or the entrance region.

One or both structures can include a tapered entrance surface forming the entrance region for a channel. The tapered entrance surface also can have an affinity for the liquid. The tapered entrance surface can have any type of tapering, including linear or a rounded surface. The tapered entrance surface can provide a smooth transition (e.g., without any abrupt changes in depth, surface irregularities, and/or the like) between the larger depth of the entrance region and the entrance of the channel. The entrance region can include one or more additional features, such as a notch, for guiding a dispensing spout to a suitable location for dispensing a liquid into the channel. The entrance region also can be formed by an opening located in one of the structures.

In an embodiment, the pair of structures are a pair of plates held closely together. In another embodiment, the pair of structures are opposing internal surfaces of an opening extending through cartridge formed of a single molded piece. In an embodiment, the channel has a depth of four millimeters or less. In a more specific embodiment the channel has a depth of two millimeters or less at the entrance of the channel.

The cartridge can include any of various combinations of features to facilitate the evaluation. An embodiment of the cartridge can include one or more transparent regions, each of which allows at least a portion of the liquid in the channel to be viewed and/or imaged there through. The transparent region can correspond to an anticipated location of a meniscus of the liquid or an entire anticipated location of the liquid. The cartridge can include a set of markings which can be used to determine a scale and/or which correspond to one or more volumes of the liquid held in the channel.

A lateral extent of the channel can be defined using any combination of various solutions. Some or all of the lateral extent of the channel can be defined by a spacer, which physically contacts one or both structures forming the channel, providing a physical barrier for the liquid. The spacer can be an adhesive that physically attaches the structures. Some or all of the lateral extent of the channel can be defined by a repellant coating applied to one or both of the structures forming the channel. The repellant coating can have a width sufficient to prevent liquid from flowing out of the channel, e.g., into an adjacent channel.

Some or all of the lateral extent of the channel can be defined by a groove formed in one or both of the structures. The groove can provide a sharp transition that prevents liquid from entering the groove. The groove can have a lateral width and depth sufficient to prevent liquid from flowing out of the channel into the groove.

A desired depth of the channel can be maintained using physical structures located along a height of the channel. Each physical structure can have a size corresponding to the desired depth at the corresponding location. The physical structures can include ball spacers. The physical structures can include protrusions formed on a surface of one or both of the structures.

The channel can have a depth that varies along a length of the channel. The varying depth can assist with wicking the liquid into the channel and/or locating a meniscus of the liquid at a desired position. The channel also can have a width that varies along the length of the channel. The varying width can be configured to reduce evaporation. The channel can include one or more curves.

An illustrative evaluation can include determining the volume of the liquid. Another illustrative evaluation can include determining a color of the liquid. A further illustrative evaluation can include determining a clarity of the liquid.

The illustrative aspects of the invention are designed to solve one or more of the problems herein described and/or one or more other problems not discussed.

BRIEF DESCRIPTION OF THE DRAWINGS

These and other features of the disclosure will be more readily understood from the following detailed description of the various aspects of the invention taken in conjunction with the accompanying drawings that depict various aspects of the invention.

FIGS. 7A and 7B show a front view and a section view, respectively, of an illustrative cartridge according to yet another embodiment.

It is noted that the drawings may not be to scale. The drawings are intended to depict only typical aspects of the invention, and therefore should not be considered as limiting the scope of the invention. In the drawings, like numbering represents like elements between the drawings.

DETAILED DESCRIPTION OF THE INVENTION

As indicated above, aspects of the invention provide a liquid evaluation system. The system can include a cartridge including a channel configured to pull a liquid into the channel by capillary action. The cartridge can include a first plate and a second plate located in close proximity to the first plate. An internal facing surface of each plate can include a corresponding region forming the channel. Each of the regions can have an affinity for the liquid. The close proximity of the plates and the regions having an affinity for the liquid cause the liquid to be pulled into the channel by capillary action. The cartridge can include one or more additional attributes and/or the system can include one or more additional components for performing the evaluation.

It is understood that, unless otherwise specified, each value is approximate and each range of values included herein is inclusive of the end values defining the range. As used herein, unless otherwise noted, the term "approximately" is inclusive of values within +/− ten percent of the stated value, while the term "substantially" is inclusive of values within +/− five percent of the stated value. Unless otherwise stated, two values are "similar" when the smaller value is within +/− twenty-five percent of the larger value. A value, y, is on the order of a stated value, x, when the value y satisfies the formula $0.1x \leq y \leq 10x$.

As also used herein, a transparent structure allows at least ten percent of radiation having a target wavelength, which is radiated at a normal incidence to an interface of the structure, to pass there through. Furthermore, as used herein, a reflective structure reflects at least ten percent of radiation having a target wavelength, which is radiated at a normal incidence to an interface of the structure.

As used herein, a top of a cartridge refers to an end of the cartridge that includes an entrance region for the channel configured for dispensing a liquid therein, while a bottom of a cartridge refers to an end of the cartridge that is located opposite the end of the cartridge with the entrance region. Unless otherwise stated, the term "lateral" refers to a plane that is parallel to the entrance region for the channel, and "lateral area" refers to a two-dimensional area of the lateral plane for a corresponding region. These terms are used for convenience and do not imply any orientation of the cartridge during use.

Figure 1:
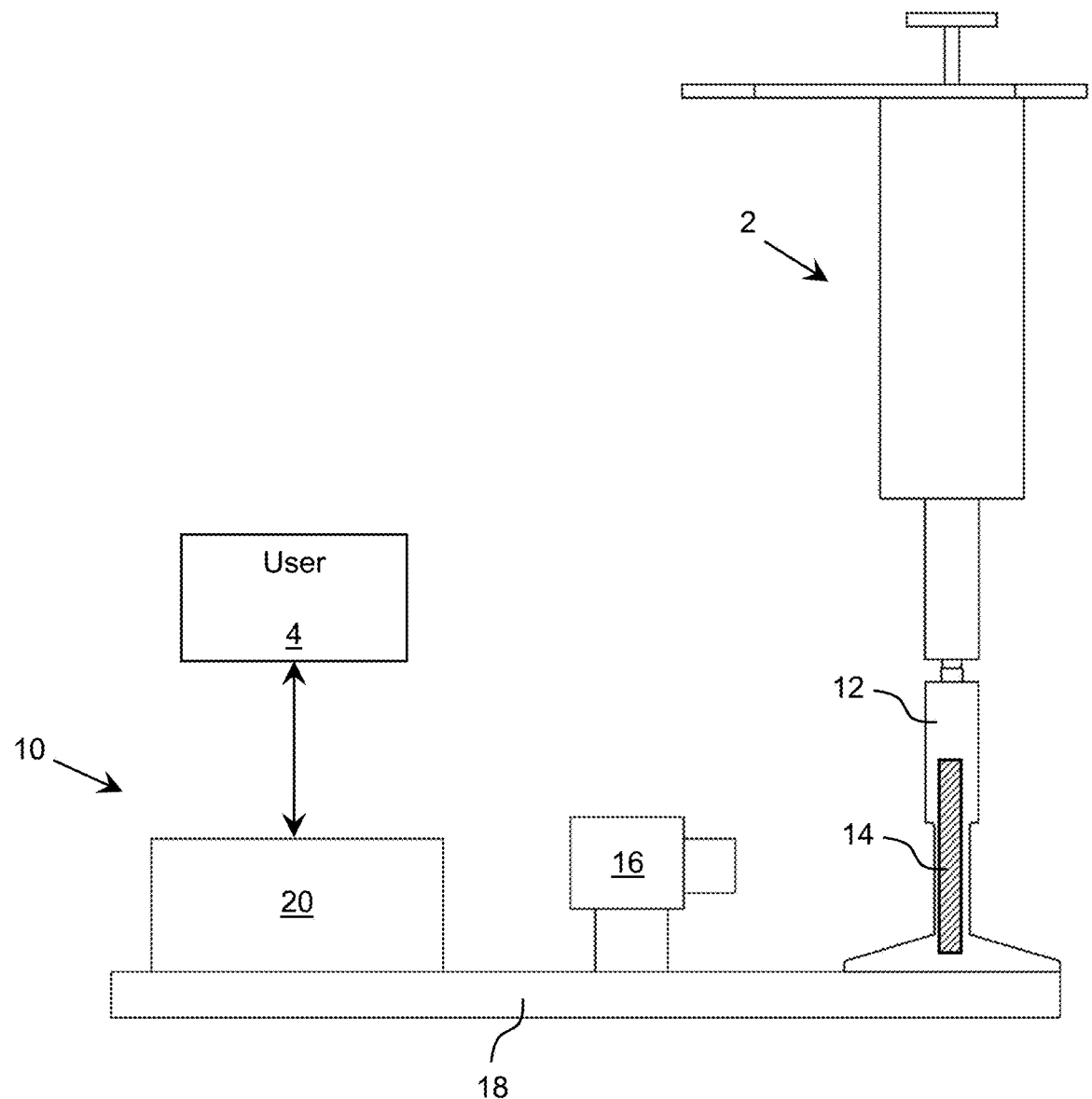
FIG. 1 shows an illustrative liquid evaluation system according to an embodiment.

Turning to the drawings, FIG. 1 shows an illustrative liquid evaluation system 10 according to an embodiment. The system 10 is shown including a stand 12, which is configured to position a cartridge 14 in a desired orientation for dispensing a liquid into one or more channels located in the cartridge 14. Once the cartridge 14 has been positioned, the liquid can be dispensed into one or more channels of the cartridge 14, e.g., using a liquid handling device 2. The system 10 can be used to evaluate one or more attributes of the liquid located in the channel(s) using any solution.

To this extent, the system 10 is also shown including an imaging device 16. The imaging device 16 can acquire image data of one or more of the channels of the cartridge 14 using any solution, which can be used as part of the evaluation of one or more of the attributes of the liquid. Illustrative imaging devices 16 include a camera which generates image data from any type of radiation (e.g., visible light), an electric circuit which senses changes in capacitance, induction, and/or resistance, at one or more points, or along a one-, two-, or three-dimensional gradient, a device that uses a scanning solution instead of a lens for generating an image, and/or the like. In an embodiment, the system 10 can further include a base 18, which is configured to hold the stand 12 and the imaging device 16 at an orientation that allows the imaging device 16 to acquire suitable image data of the channel(s) in the cartridge 14. For example, the base can include one or more grooves, markings, and/or the like, that can direct a user as to proper placement of the stand 12 and the imaging device 16. In an embodiment, one or more of the stand 12 or the imaging device 16 is secured to the base 18 using any solution. Regardless, as illustrated, the imaging device 16 can be oriented such that is field of view is substantially orthogonal to a plane of a front face of the cartridge 14.

In an embodiment, the imaging device 16 can provide the image data to a computer system 20. The computer system 20 can comprise any combination of one or more computing devices. Each computing device can be any type of computing device. An illustrative computing device includes a general purpose computing device programmed to perform an evaluation process described herein. However, it is understood that a computing device can comprise any type of computing device that may or may not execute program code. When the computer system 20 includes multiple computing devices, the computing devices can be located in disparate locations and communicate with one another via any combination of optical fiber, wired, and/or wireless links; comprise any combination of one or more types of networks; and/or utilize any combination of various types of transmission techniques and protocols.

The evaluation process can be automated, semi-automated, or manual. Regardless, the computer system 20 can include a set of interfaces that enable a user 4 (e.g., a human and/or another computing device) to direct operation of the system 10 to perform an evaluation and/or otherwise interact with the system 10. For example, the user can obtain the results of an evaluation, review past evaluations, manage the data for one or more evaluations, etc. While not shown, it is understood that the system 10 can include any combination of various other devices that may be suitable for use in the evaluation. Such devices can include one or more lighting (visible or other radiation) devices, sensors for ambient conditions such as temperature or pressure, a container of a liquid (e.g., a dye or dyed liquid) to be used in an evaluation, and/or the like.

The computer system 20 can store the image data along with other data as a record of an evaluation. The other data can include any combination of various data corresponding to the evaluation including, for example: identification information for one or more of: a user, a liquid handling device (e.g., a serial number), a cartridge (e.g., serial number, cartridge identifier, etc.), and/or identification data of the liquid (e.g., type of liquid used, location of a sample, etc.); a date and time stamp; temperature data; measurement data; a result of the evaluation; and/or the like. In an embodiment, the computer system 20 can process the image data to evaluate one or more of the attributes of the liquid. For example, the computer system 20 can process the image data to determine (measure) one or more of: a volume, a color, a clarity, and/or the like, of the liquid present in a channel.

The system 10 can be configured for use in conjunction with any type of liquid handling device 2 or system. An example of a liquid handling device is a pipette. The pipette can comprise any of various types of pipettes used in the art. In a more particular embodiment, the pipette is a multichannel pipette. The pipette can be utilized by a human user or operated by a robotic device under automatic or semiautomatic control. However, it is understood that a pipette is only illustrative of various types of human and/or machine operated liquid handling devices capable of being used in conjunction with embodiments of the invention described herein.

Additional details of illustrative aspects of the invention are further described in conjunction with a system including a multichannel cartridge, which can be used to measure a volume of a liquid in one or more of the channels of the cartridge. The volume measurement can be part of, for example, a process for determining an accuracy of a liquid handling device (e.g., a single or multichannel pipette), a consistency and/or accuracy with which a volume of liquid is dispensed by a liquid handling system (e.g., a robotic system, a user operating a pipette, and/or the like). The multichannel cartridge can include a number of channels with a corresponding spacing between the channels that are configured to enable a corresponding multichannel liquid handling device to concurrently dispense liquid from each of its dispensing spouts into distinct channels of the cartridge.

However, it is understood that embodiments of the invention described herein are not limited to multichannel cartridges and/or liquid volume measurement. To this extent, embodiments of the invention can comprise a cartridge including a single channel. Additionally, embodiments of the invention can be utilized to evaluate one or more other attributes of the liquid volume, such as a color, a clarity, and/or the like. Such evaluations can be part of various processes for evaluating a liquid, such as for a presence of one or more chemicals, contaminants, and/or the like. In this case, a liquid sample can be obtained and placed within a channel, with or without treatment, to evaluate the corresponding attribute(s) of the liquid. Still further, embodiments of a multichannel cartridge can include channels configured to measure different volumes of a liquid, e.g., to enable testing of an ability of a liquid handling system to accurately dispense different volumes of liquid.

Regardless, the liquid can be any type of liquid that is desired for evaluation and/or suitable for evaluating a liquid handling system. Illustrative liquids include any of various aqueous liquids, such as water, a biological sample (e.g., blood), a reagent, a buffer solution, etc., any of various oil-based liquids, such as petroleum products, lipids, etc. When the evaluation is performed as part of analyzing an accuracy and/or consistency of a liquid handling system in dispensing a volume of liquid, the liquid can be configured to assist in measuring the volume to a desired degree of accuracy. For example, the liquid can be water distilled to a particular target purity level, a liquid that has been dyed to have a color that visually distinguishes (e.g., by increasing a contrast between) the liquid and the cartridge or other environment, and/or the like. In embodiments where one or more other attributes of the liquid are evaluated, the liquid can comprise any type of liquid sample. For example, the liquid can comprise water, which is sampled from any of numerous locations, blood drawn from a patient, and/or the like.

Figure 2A:
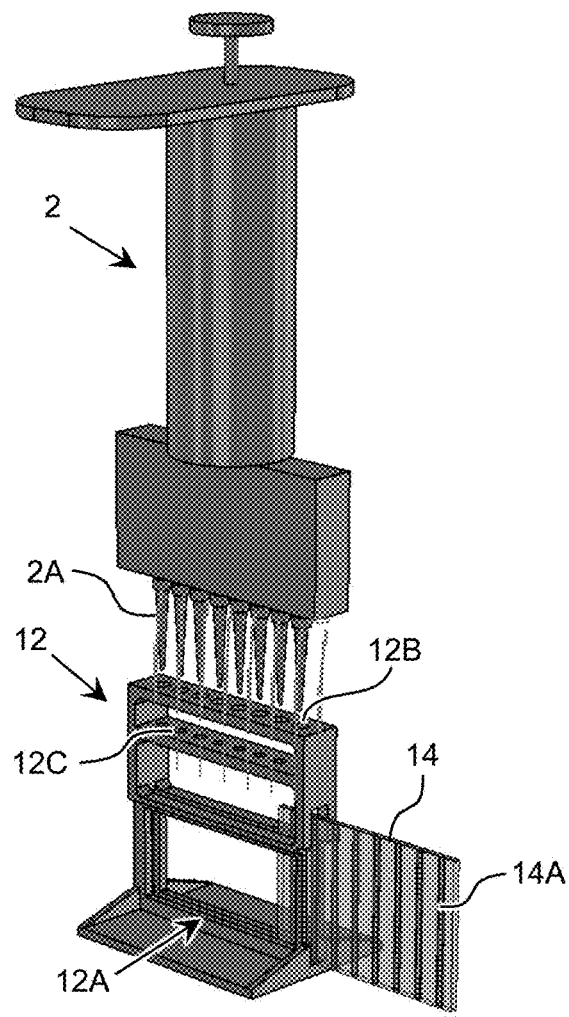
FIGS. 2A and 2B show an exploded perspective view and a perspective view, respectively, of an illustrative stand and an illustrative multichannel cartridge used in conjunction with a multichannel pipette according to an embodiment.
Figure 2B:
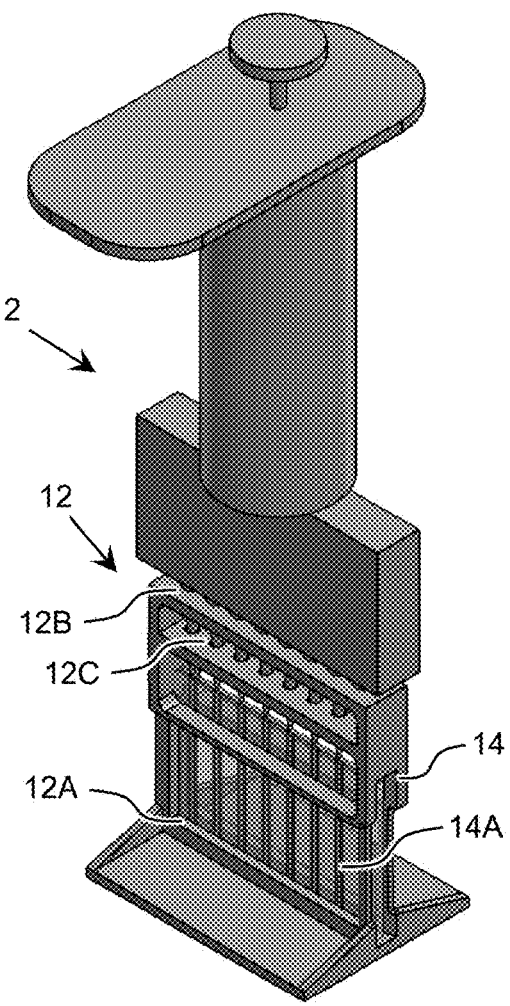

Additional details of an illustrative stand and cartridge are shown in FIGS. 2A and 2B, which show an exploded perspective view and a perspective view, respectively, of an illustrative stand 12 and an illustrative multichannel cartridge 14, according to an embodiment. In the drawings, a multichannel pipette 2 is shown being used in conjunction with the stand 12 and the cartridge 14. However, it is understood that this is only illustrative of various liquid handling devices that can be utilized. The stand 12 can be fabricated using any solution. For example, the stand 12 can comprise one or more molded plastic parts or machined parts, which can be permanently or temporarily secured to each other using any of various solutions or fabricated using 3D printing.

Regardless, the stand 12 can be configured to position the multichannel cartridge 14 in a desired orientation. For example, the stand 12 can be configured to position the cartridge 14 in an upright position. In this case, each of the channels 14A of the cartridge 14 can have an entrance region that is raised above an exit opening of the channel 14A. In a more particular embodiment, the stand 12 can position the cartridge 14 such that the channels 14A are in a substantially vertical orientation. However, it is understood that the channels 14A can have any desired orientation, including horizontal and any orientation between horizontal and vertical. Additionally, the channels 14A can be oriented at an angle with respect to horizontal such that the exit opening of the channel 14A is above the entrance region for the channel 14A, e.g., to encourage gravity to pull the liquid in the channel 14A to remain near the entrance of the channel 14A.

The stand 12 can position the cartridge 14 using any solution. For example, as illustrated, the stand 12 can be configured such that the cartridge 14 is laterally inserted into a desired position. In this case the stand 12 can include an opening and corresponding set of guides 12A (e.g., a track) that directs the cartridge 14 into position. However, it is understood that this is only illustrative of numerous solutions for positioning the cartridge 14 using the stand 12. Other solutions can insert the cartridge 14 from the top, bottom, front, back, and/or the like. Additionally, the stand 12 and cartridge 14 can be configured to secure the cartridge 14, e.g., using a catch or fastener, which can secure the cartridge 14 in position and can allow the cartridge 14 to be removed from the stand 12 when desired. Regardless, the stand 12 and cartridge 14 can be sized so that the cartridge 14 is appropriately positioned when inserted into the stand 12 and abutting a mechanical stop. Additionally, the stand 12 and cartridge 14 can include one or more features (e.g., complementary shapes, visual indicators, and/or the like) that ensure that the cartridge 14 is inserted into the stand 12 with the entrances to the channels 14A located in the correct position.

Once the cartridge 14 is positioned in the stand 12, e.g., as shown in FIG. 2B, liquid can be dispensed into one or more of the channels 14A of the stand 12. In an embodiment, the stand 12 can include one or more features to assist in aligning one or more dispensing spouts 2A (e.g., pipette tips) of the pipette 2 with one or more channels 14A of the cartridge 14 so that the liquid can be properly dispensed from the dispensing spout(s) 2A of the pipette 2 into the channel(s) 14A of the cartridge 14. For example, the stand 12 is shown including a mechanical guide 12B. The guide 12B can comprise a set of through holes, each of which is vertically aligned with a channel 14A of a cartridge 14 properly positioned in the stand 12. Additionally, the stand 12 is shown including a mechanical stop 12C, which defines a maximum insertion point for the dispensing spout(s) 2A of the pipette 2 with respect to the entrance region for the channel(s) 14A of the cartridge 14. In an embodiment, the mechanical stop 12C comprises a set of through holes, each of which is vertically aligned with a channel(s) 14A of the cartridge 14 and sized to only allow a portion of the dispensing spout 2A of a corresponding pipette 2 to be inserted there through.

Figure 3A:
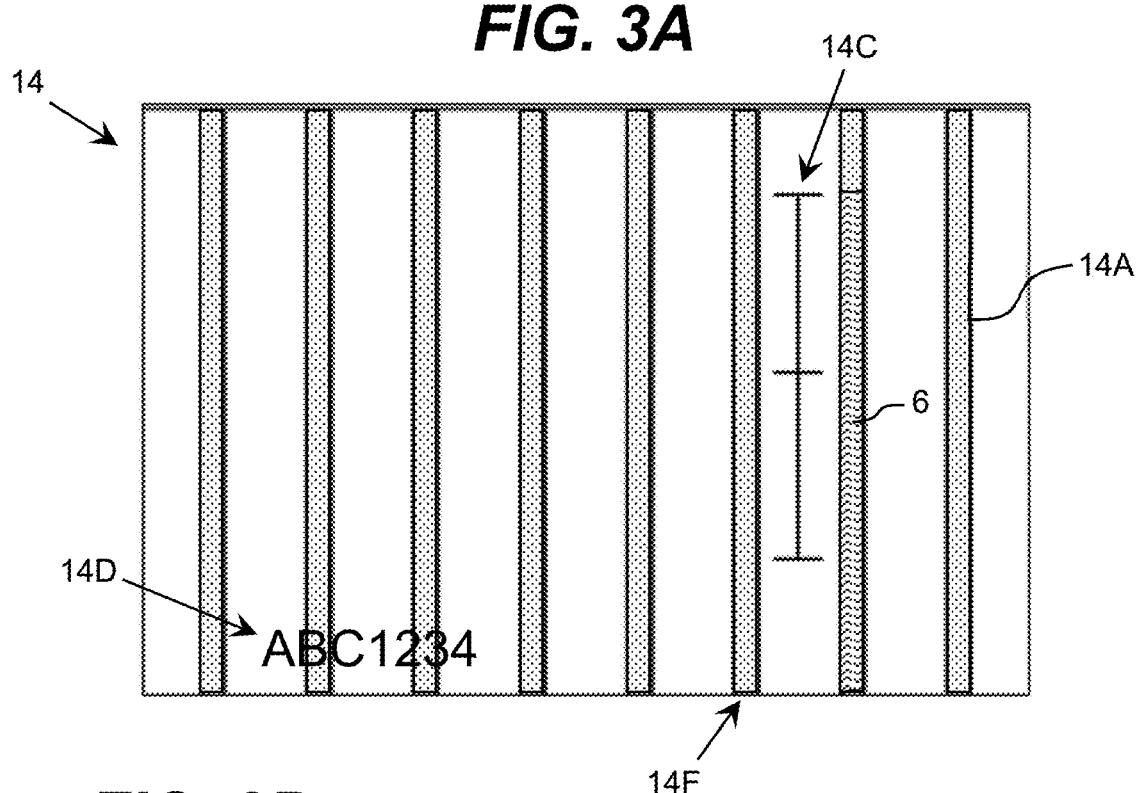
FIGS. 3A-3D show various views of an illustrative multichannel cartridge according to an embodiment.
Figure 3B:
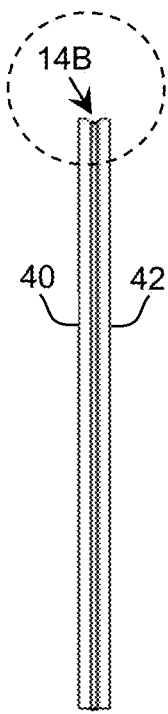
Figure 3C:
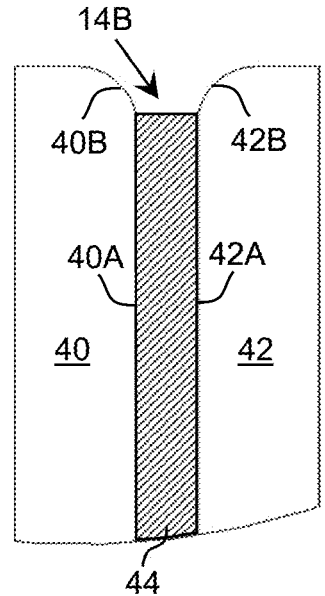
Figure 3D:
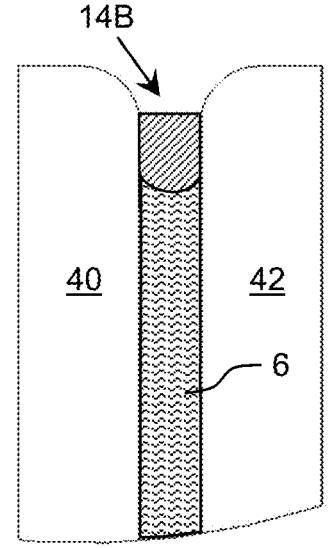

The cartridge 14 can include one or more features to assist in dispensing a volume of liquid into the channel(s) 14A and/or evaluating the liquid present in the channel(s) 14A. To this extent, FIGS. 3A-3D show various views of an illustrative multichannel cartridge 14 according to an embodiment. In particular, FIGS. 3A and 3B show front and side views, respectively, of the multichannel cartridge 14, while FIGS. 3C and 3D show detailed side views of an entrance region 14B for a channel 14A without and with a liquid volume 6 present therein.

In an embodiment, each channel 14A in the cartridge 14 is formed by region of an internal facing surface 40A of a first plate 40, which forms at least one side of each channel 14A, located in close proximity to a region of an internal facing surface 42A of a second plate 42, which also forms at least one side of each channel 14A. As a result, each channel 14A can have a rectangular lateral surface area with parallel sides defined by the regions of the internal facing surfaces 40A, 42A of the plates 40, 42. In embodiments, the lateral surface area of a channel 14A has an oblong shape, which can be a rectangle, a rounded rectangle, a parallelogram, a trapezoid, and/or the like.

The internal facing surface 40A, 42A of one or both of the plates 40, 42 and a distance (e.g., gap) between the plates 40, 42 can be configured such that liquid dispensed at the entrance region 14B is pulled into the channel 14A by capillary action. To this extent, a depth (as measured by the distance between the internal facing surfaces 40A, 42A below the entrance region 14B) of the channel 14A at a given location can be approximately 4 millimeters or less, approximately 2 millimeters or less in a more particular embodiment. In still more particular embodiments, the depth can be on the order of 100 microns. However, it is understood that the depth can be even less than 10 microns in embodiments. A lateral width (as measured perpendicular to the depth and the liquid flow direction within the channel) of the channel 14A at a given location can vary significantly depending on the application. In an embodiment, the lateral width is in a range between 50 microns and 2 centimeters. However, it is understood that widths outside of these ranges are possible. An acceptable variance of the actual dimensions of a channel 14A from a stated dimension of the channel 14A also can differ based on the application. In an illustrative embodiment, the acceptable variance of the dimensions of the channel 14A from the stated dimensions are within +/−500 nanometers.

When liquid 6 is dispensed onto one of the plates 40, 42 at the entrance region 14B, surface tension can cause the liquid 6 to spread out on the plate and contact the other plate. Alternatively, the liquid 6 can be dispensed such that it contacts both plates 40, 42. Regardless, the liquid is then wicked into the channel 14A as shown in FIGS. 3A and 3D. As the channel 14A encapsulates most of the surface of the liquid 6, only small portions of the surface of the liquid 6 are exposed to evaporation, thereby providing a more accurate measurements, such as a volumetric measurement. Limiting the evaporation of the liquid 6 can also provide additional time to obtain measurement data. For example, after dispensing the liquid 6, the cartridge 14 can be relocated (e.g., removed from the stand 12) prior to being imaged as part of measuring one or more attributes of the liquid 6.

In a more particular illustrative application, the cartridge 14 can be used to evaluate an accuracy with which a 10 microliter (μL) volume of a liquid 6 is dispensed into a channel 14A. In this case, the liquid 6 can comprise a liquid configured for such an evaluation. For example, the liquid 6 can be a dye or a dyed liquid. To measure the dispensed volume of the liquid 6 to an accuracy of 1% or better, the distance between the plates 40, 42 can be approximately 100 microns and should be known to within +/−500 nanometers. Using these values, the 10 microliter volume of the liquid 6 will fill an area of approximately 100 square millimeters. When the area can be measured to within approximately 0.3%, the actual volume of the liquid 6 will be known to an accuracy better than +/−1%.

Measurement of the area of the volume of liquid 6 in this embodiment can be performed using an imaging device 16 (FIG. 1) and a computer system 20 (FIG. 1). For example, assuming the area of the liquid 6 is approximately 4 mm×25 mm, then each dimension should be measured to within about 10 microns (μm), e.g., 4+/−0.01 mm×25+/−0.01 mm. If the imaging device acquires image data having 10 micron square pixels, the image data of the channel 14A including the liquid 6 would have a size of approximately 400×2500 pixels. In an embodiment, the lateral dimensions of the channel 14A may be known to a higher degree of accuracy. This knowledge can be used to determine an accurate scale for the image data and/or increase an accuracy with which the measurement is made. For a colored liquid, such as a dye, pixels imaging the liquid 6 in a region that is away from the boundaries of the dyed liquid will read an amount of color. Pixels imaging regions of the dyed liquid at the boundary may sense less color since a portion of the pixel does not sense the color. The datum from such a pixel can be interpolated to report a corresponding amount of liquid.

An internal facing surface 40A, 42A of one or both plates 40, 42 can have an affinity for the liquid 6 intended to be dispensed therein. To this extent, for an aqueous liquid, at least the internal facing surface 40A, 42A of one or both plates 40, 42 can be a hydrophilic surface. For an oil-based liquid 6, at least the internal facing surface of one or both plates 40, 42 can be a lipophilic surface. In an embodiment, the internal facing surfaces 40A, 42A of the plates 40, 42 have approximately the same affinity for the liquid 6. To this extent, the internal facing surfaces 40A, 42A can be formed of the same material. However, it is understood that this is only illustrative. In an alternative embodiment, one of the internal facing surfaces can have a much stronger affinity for the liquid 6 than the other surface.

The entrance region 14B for the channel 14A can be configured to help draw the liquid 6 into the channel 14A and/or assist in guiding a dispensing spout of the liquid handling device to the entrance region 14B. For example, one or both plates 40, 42 can include a smoothly tapered entrance surface 40B, 42B, which causes a depth of the entrance region 14B (as measured by the average distance between the tapered entrance surfaces 40B, 42B) to be larger than a depth of the channel 14A, at least at an entrance to the channel 14A. An entrance of the channel 14A can correspond to a location of the plate(s) 40, 42 at which the tapered entrance surface(s) 40B, 42B ends. In an embodiment, a spacer 44 extends only to the entrance of the channel 14A as illustrated in FIG. 3C. However, it is understood that the spacer 44 could extend further upward to some or all of the entrance region 14B. The amount and/or shape of the tapering can be selected based on any of numerous factors including, for example, the dimensions of a dispensing spout 2A of a liquid handling device 2 which may be used to dispense the liquid 6 into the channel 14A. As illustrated, the tapered entrance surface 40B, 42B of each plate 40, 42 can extend approximately the same depth as the widened distance, with a curved angle defining the tapered entrance surfaces 40B, 42B. The tapered entrance surfaces 40B, 42B can have an affinity for the liquid 6. Inclusion of the tapered entrance surfaces 40B, 42B can help to ensure that all the liquid 6 enters the channel 14A as a sharp transition can prevent at least some of the liquid 6 from entering the channel 14A.

Each plate 40, 42 can be fabricated from any combination of one or more suitable materials. In an embodiment, at least a front facing plate can include one or more transparent regions, which allow relevant radiation to pass there through, so that at least a portion of each channel 14A can be viewed and/or imaged there through. In an embodiment, the front facing plate is at least partially formed of a material transparent to visible light, such as glass. However, it is understood that visible light is only illustrative of the radiation that can be used for imaging. Additionally, it is understood that any combination of one or more suitable materials can be used to form the front facing plate, including glass, fused silica, quartz, polycarbonate, acrylic, etc. In an embodiment, the back facing plate is formed from the same material(s) as the front facing plate. Alternatively, the back facing plate can be at least partially formed of a material that reflects, absorbs, and/or the like, the radiation. In this case, the back facing plate can provide a background useful for viewing and/or imaging the liquid 6 present in a channel 14A. For example, the back facing plate can be formed of any of one or more of glass, silicon, metal, composites, ceramic, plastic, etc.

As discussed herein, at least the portion of an internal facing surface 40A, 42A of a plate 40, 42 that defines a side of a channel 14A can have an affinity for the liquid 6. In an embodiment, the plate 40, 42 is formed of a material having an affinity for the liquid 6. In an alternative embodiment, one or more regions of the internal facing surface 40A, 42A of the plate 40, 42 can be coated with a substance having an affinity for the liquid 6. For the front facing plate, the coating can be transparent to the relevant radiation used to view and/or image at least a portion of the liquid 6 present within the channel 14A. For the back facing plate, the coating also can be transparent or can be reflective or absorbing of the radiation. An illustrative hydrophilic coating for aqueous liquids is silicon dioxide, while an illustrative lipophilic coating for oil-based liquids is polytetrafluoroethylene (PTFE).

As shown in FIG. 3A, the cartridge 14 can include any combination of various markings, which can assist in evaluating the liquid 6. For example, the cartridge 14 is shown including a set of scale lines 14C, which can define one or more physical distances. The scale lines(s) 14C can be configured to enable image data to be scaled properly. The scale lines 14C can be located on an outside of the cartridge 14 or on an internal facing surface 40A, 42A. For visual inspection, the cartridge 14 can include a set of scale lines 14C that can be visually associated with each channel 14A. For example, the cartridge 14 can include one or more scale lines 14C that are immediately adjacent to each channel 14A and/or intersect and extend through each channel 14A. In either case, the physical distance(s) defined by the scale lines 14C can correspond to one or more volumes of the liquid 6 within the channels 14A.

Additionally, the cartridge 14 can include identification data 14D for the cartridge 14. The identification data 14D can allow the cartridge 14 to be tracked. For example, when an actual distance between the plates 40, 42 varies among cartridges, the identification data 14D can enable the actual distance to be correlated with the cartridge 14. To this extent, the identification data 14D can include one or more codes, which can contain the gap dimensions in several locations of the cartridge 14. The gap may be measured, for example, using interferometry, imaging of the cartridge 14 on edge, and/or the like. Such information can enable a computer system to interpolate or extrapolate the gap for every coordinate on the cartridge 14. Additionally, the cartridge 14 can contain a formula that specifies the gap for every coordinate or channel on the cartridge. Alignment marks also can be on one or both plates 40, 42.

Figure 3E:
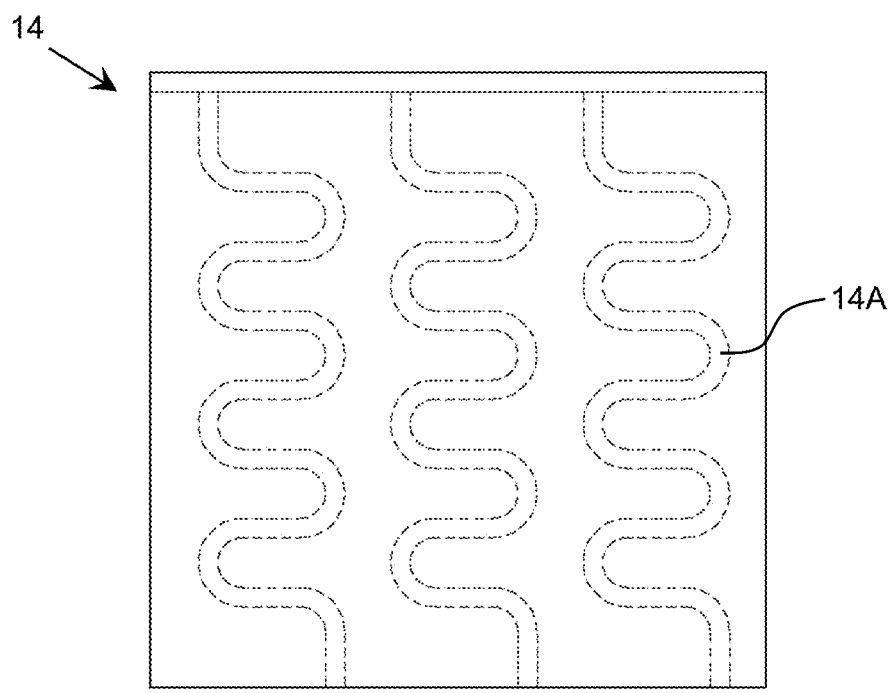
FIG. 3E shows an illustrative multichannel cartridge with serpentine channels according to an embodiment.

While the cartridge 14 is shown including channels 14A that are straight and have a uniform lateral width, it is understood that a cartridge described herein can have channels with any combination of one or more curves, one or more variations in lateral width, variations in depth, and/or the like. For example, FIG. 3E shows an illustrative cartridge with serpentine channels 14A according to an embodiment. As illustrated, a serpentine channel 14A can be formed by a plurality of curves causing the channel 14A to follow a sinuous path. The serpentine channels 14A allow a larger volume of liquid to be placed in each channel 14A for a cartridge 14 of a given height. Similarly, for a given volume of liquid, a longer, narrower channel can allow for graduations of smaller increments, so the user may be able to more accurately read the volume of the liquid 6.

Figure 4A:
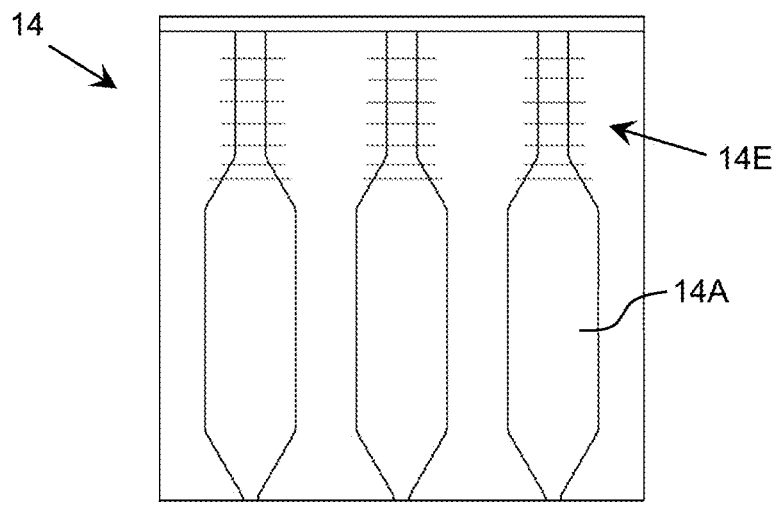
FIGS. 4A-4C show various illustrative features, one or more of which can be incorporated into a cartridge described herein according to embodiments.
Figure 4B:
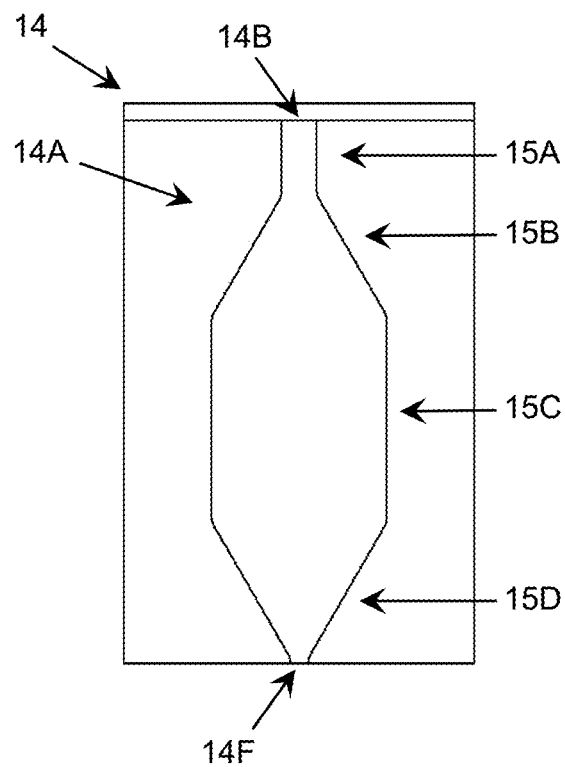
Figure 4C:
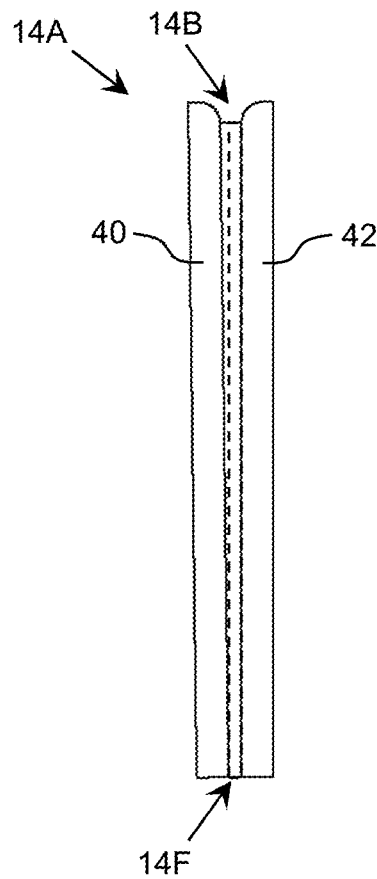

The cartridge 14 and/or channel(s) can include one or more features to increase an accuracy with which the dispensed volume of liquid can be measured. To this extent, FIGS. 4A-4C show various illustrative features, one or more of which can be incorporated into a cartridge described herein according to embodiments. In FIG. 4A, the cartridge 14 can include multiple channels 14A, each with its own measurement markings 14E (e.g., graduations). The measurement markings 14E can comprise multiple lateral lines intersecting and extending through the channel 14A at several heights. Each of the measurement markings 14E can correspond to a given volume. In this case, the channel 14A can include one or more attributes which cause a meniscus of the volume of liquid to repeatedly be located at a given position. For example, a channel 14A can have a depth that decreases over some or all of the channel 14A. In this case, the liquid will be strongest attracted to the region with the narrowest depth. As a result, when the dimensions of the channel 14A and the location of the meniscus of one end of the volume of liquid are known to a high degree of accuracy, a location of the other meniscus of the volume of liquid with respect to the set of measurement markings 14E is the only measurement that needs to be accurately performed.

FIG. 4B shows an illustrative cartridge 14 with a single channel 14A. In this case, the channel 14A includes four vertical sections 15A-15D. In the section 15D adjacent to an exit opening 14F, a lateral width of the channel 14A continually decreases to the exit opening 14F of the cartridge 14. This configuration can reduce evaporation of the liquid through the exit opening 14F of the channel 14A than would otherwise occur with an exit opening 14F having a larger lateral area. A central section 15C of the channel 14A can be significantly wider than an entrance section 15A adjacent to the entry region 14B for the channel 14A. A wide central section 15C can allow for the volume of liquid to be more readily viewed/imaged and can allow the channel 14A to hold an overall larger volume of liquid for a given height of the channel 14A. A transition section 15B can be located between the entrance section 15A and the central section 15C. Inclusion of the transition section 15B can help prevent the formation of bubbles within the volume of liquid. However, it is understood that the presence of bubbles within the volume of liquid can be accounted for when performing the measurement, e.g., by analyzing image data. Additionally, the transition section 15B and entrance section 15A can provide for a more accurate measurement using the measurement markings 14E (FIG. 4A) as well as provide a smaller surface area of the liquid exposed to evaporation at the entrance region 14B.

As illustrated in FIG. 4C, in addition to or as opposed to a varying lateral size of the channel 14A, an embodiment of a channel 14A can have a depth that varies along some or all of the length of the channel 14A. For example, the varying depth can result in a depth that tapers toward the exit opening 14F of the channel 14A. As illustrated by the dashed line, a depth of the channel 14A at the entrance region 14B for the channel can be larger than (e.g., approximately twice as much as) a depth of the channel 14A at the exit opening 14F of the channel 14A. However, it is understood that this is only illustrative and the depth can vary by any desired amount, including by amounts much smaller than the variation shown in FIG. 4C. Regardless, the variation exceeds unintended variations that may result from the limits of a manufacturing process utilized to form the structure. Additionally, the depth of the channel 14A can increase in a direction away from the entrance region 14B rather than decreasing as illustrated. The varying depth also can increase the surface to volume ratio of liquid in the channel 14A, and surface tension will cause the liquid to wick to the shallow end of the channel 14A away from the entrance region 14B. In an embodiment, the varying depth can be implemented by securing the plates 40, 42 at an angle with respect to each other. In another embodiment, one or both plates 40, 42 can include one or more bends such that at least a portion of the channel 14A has a depth that changes along at least a portion of the channel 14A.

The lateral extent of each channel 14A of a cartridge can be defined using any of various channel definition solutions. In an embodiment, the lateral extent of each channel 14A is defined by one or more spacers 44 (FIG. 3C) located between the plates 40, 42. As discussed above, each spacer 44 can have a thickness that results in a depth of the channel 14A of 2 mm or less, with the lateral width of most of the channel 14A being significantly more. As the edges of each channel 14A provide only a relatively small portion of the surface of the channels 14A, the surfaces of the spacers 44 do not need to have an affinity for the liquid (e.g., be hydrophilic or lipophilic). In an embodiment, each spacer 44 is formed of a material and/or has a surface that has little or no affinity for the liquid being dispensed into the channel 14A. Furthermore, each spacer 44 can be shaped using any of various solutions, including die cutting, photolithography, chemical etching, and/or the like. Illustrative materials for the spacers 44 include a die cut adhesive, an adhesive-coated chemically etched metal, and/or the like.

Figure 5A:
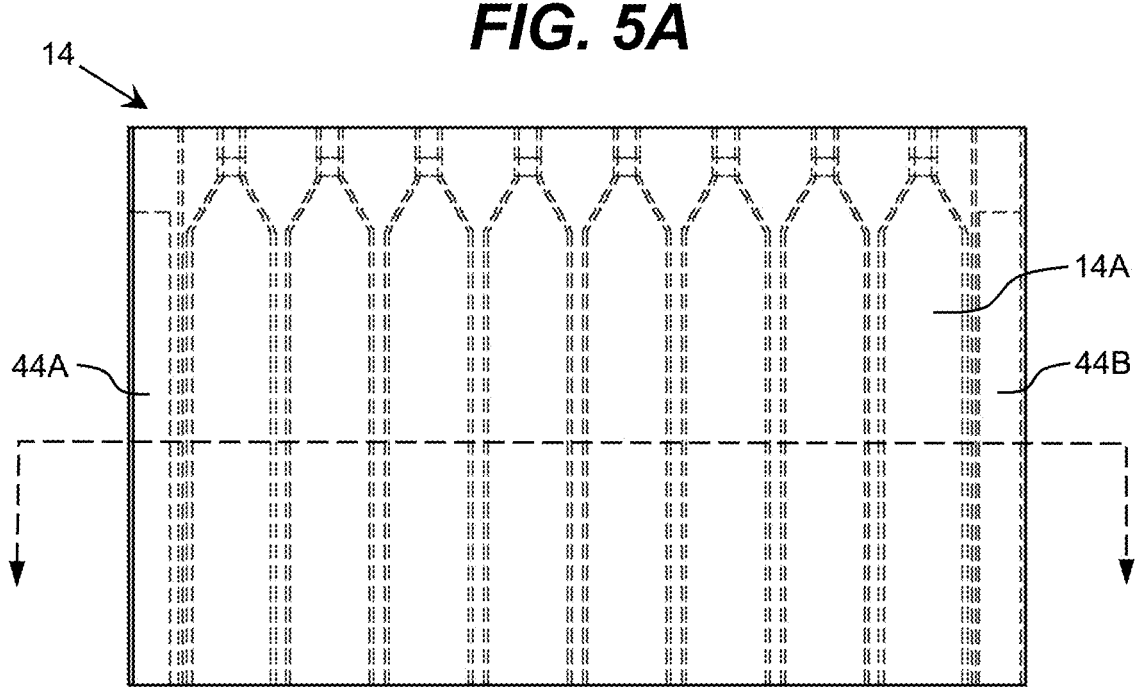
FIGS. 5A and 5B show a front view and a section view, respectively, of an illustrative cartridge according to another embodiment.
Figure 5B:
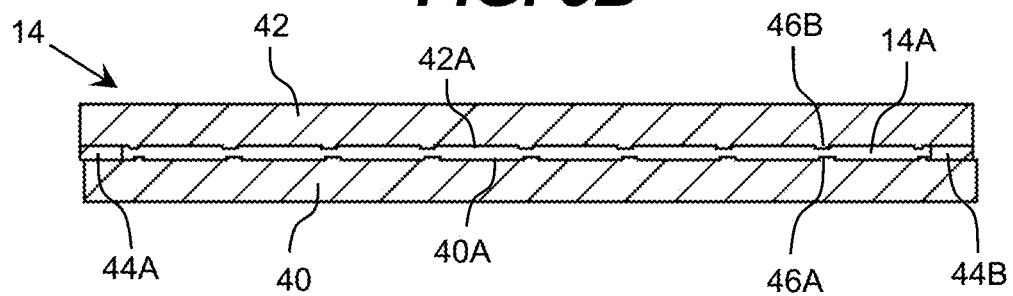

FIGS. 5A and 5B show a front view and a section view of an illustrative cartridge 14 according to another embodiment. In this case, a lateral extent of each of the channels 14A is at least partially defined by repellant coatings 46A, 46B applied to the internal facing surface 40A, 42A of each plate 40, 42. The coatings 46A, 46B provide a hydrophobic (for aqueous liquids) or lipophobic (for oil-based liquids) surfaces, which prevent the liquid from spreading across their surfaces. To this extent, as illustrated in FIG. 5B, the coatings 46A, 46B do not need to contact each other to provide a physical barrier across an entire depth of the channels 14A. While the cartridge 14 is shown including repellant coatings 46A, 46B with internal facing surfaces 40A, 42A having an affinity for the liquid, it is understood that an embodiment of the cartridge 14 can include coatings having an affinity for the liquid with internal facing surfaces that repel the liquid. For example, for an aqueous solution, the plates 40, 42 can be plastic, coated in regions to be hydrophilic, and/or the like Regardless, the coatings 46A, 46B can be patterned extremely accurately using current technology, such as a photoresist, patterned using photolithography, etc. One or both of the coatings 46A, 46B can be transparent, opaque or translucent. Additionally, misalignment of the coatings 46A, 46B deposited on the opposing internal facing surfaces 40A, 42A can be determined. For instance, for transparent coatings 46A, 46B, a dye will not appear as dark in regions where the dye does not completely fill the gap, as it would in a region in which the coating on one wall does not overlap a coating on the opposite wall. For opaque coatings 46A, 46B known to be patterned very accurately, a difference between a measured lateral width of a transparent region versus the known patterned width (e.g., 1.9 mm versus 2.0 mm) can be presumed to be the result of misalignment (e.g., 0.1 mm). A measurement system (e.g., the computer system 20 shown in FIG. 1) can employ a compensation technique to accurately estimate the hidden volume of liquid. The measurement system can employ similar compensation solutions for transparent and translucent coatings.

The cartridge 14 can further include end spacers 44A, 44B that hold the plates 40, 42 together at a desired spacing for the channel 14A depths. Each end spacer 44A, 44B can be fabricated from any type of material as described herein. In an embodiment, an end spacer 44A, 44B can define at least a portion of a lateral extent of one side of an immediately adjacent channel 14A. Alternatively, as shown in FIGS. 5A and 5B, the coatings 46A, 46B can define both sides of all of the channels 14A.

Figure 6A:
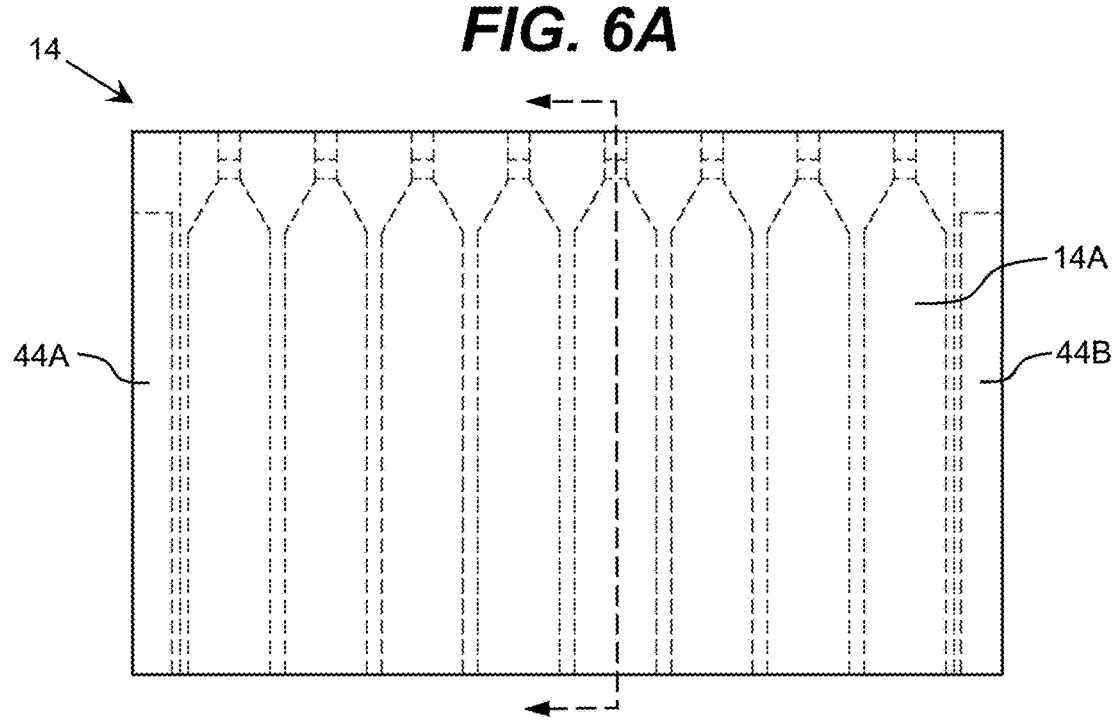
FIGS. 6A-6C show a front view, a top view, and a side cross-section view, respectively, of an illustrative cartridge according to still another embodiment.
Figure 6B:
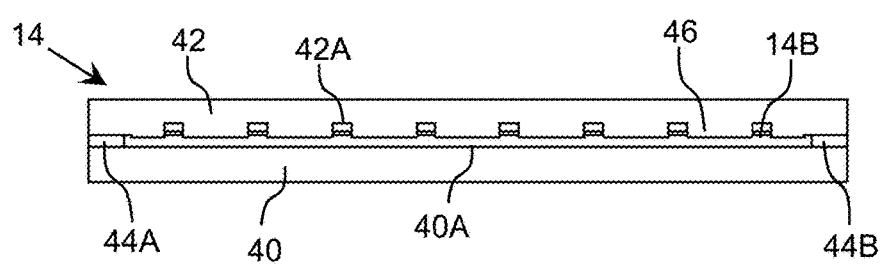
Figure 6C:
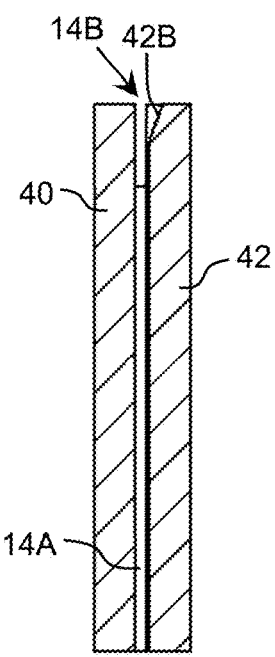

In an embodiment, only one of the internal facing surfaces is coated with a repellant coating to define a lateral extent of the channels. For example, FIGS. 6A-6C show a front view, a top view, and a side cross-section view, respectively, of an illustrative cartridge 14 according to another embodiment. In this case, a lateral extent of each of the channels 14A is at least partially defined by a repellant coating 46 applied to the internal facing surface 42A of only the plate 42. While the liquid in a channel 14A will spread beyond the repellant coating 46 on the opposing surface 40A, the liquid will only spread so far, so the repellant coating 46 having a sufficient lateral width will prevent the liquid from traveling laterally out of the channel 14A. The lateral width required for the repellant coating 46 can vary based on attributes of the liquid and/or a distance between adjacent channels. In an embodiment, the lateral width of the repellant coating 46 is at least three times a depth of the channels 14A. However, it is understood that the lateral width can vary by an order of magnitude in certain applications. A volume of the liquid that spreads beyond the repellant coating 46 on the opposing surface 40A can be accurately estimated using any solution.

As illustrated most clearly in FIG. 6C, an entrance region 14B for a channel 14A can be formed by one or both of the plates having a tapered entrance surface. In this example, only the plate 42 includes a tapered entrance surface 42B. The tapered entrance surface 42B in this embodiment is a linear taper.

FIGS. 7A and 7B show a front view and a section view of an illustrative cartridge 14, which illustrate use of still another solution for defining a lateral extent of the channels 14A, according to another embodiment. In this case, each internal facing surface 40A, 42A has barrier grooves 48A, 48B formed therein to define the boundaries of the channels 14A. For example, surface tension can retain the liquid in the channel 14A formed between the plates 40, 42 when there is a greater ratio of surface to volume in contact with the attractive internal facing surfaces 40A, 42A than in the barrier grooves 48A, 48B.

The depth and/or lateral width required for each barrier groove 48A, 48B can vary based on attributes of the liquid and/or a distance between adjacent channels. In an embodiment, each barrier groove 48A, 48B has a depth of at least three times as deep as the depth of the channels 14A. Furthermore, a barrier groove 48A, 48B can have a lateral width that exceeds the depth of the channels 14A. For example, the lateral width can be at least three times wider than that of the depth of the channels 14A. However, it is understood that each of the lateral width and depth can vary by an order of magnitude in certain applications. The barrier grooves 48A, 48B can be formed using any solution, such as chemical etching or laser engraving.

Figure 8A:
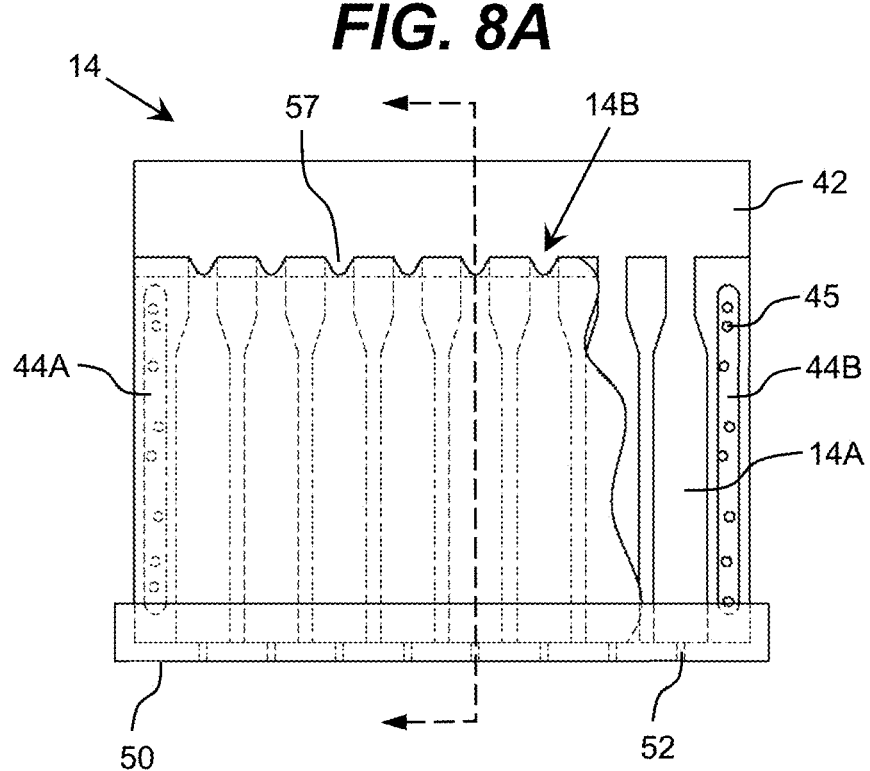
FIGS. 8A and 8B show a cutaway front view and side cross-section view of an illustrative cartridge according to an embodiment.
Figure 8B:
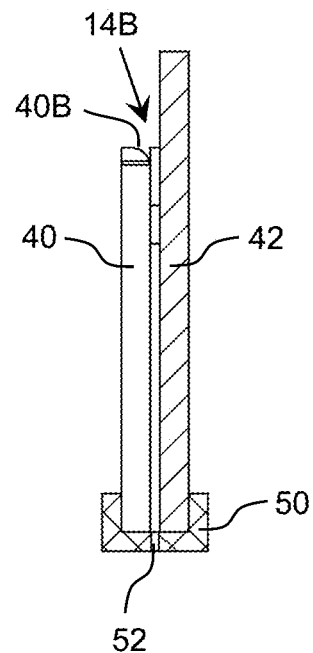

FIGS. 8A and 8B show a cutaway front view and side cross-section view of an illustrative cartridge 14 according to an embodiment. In this case, the cartridge 14 is shown including a plurality of channels 14A, each of which can be defined using a solution described herein. Additionally, the cartridge 14 is shown including end spacers 44A, 44B. As illustrated, each end spacer 44A, 44B can include a plurality of physical structures 45 located along a height of the end spacer 44A, 44B. Each physical structure 45 can comprise any type of structure to ensure a desired spacing between the plates 40, 42.

For example, the physical structures 45 can comprise ball spacers (e.g., microbeads), which can have diameters corresponding to the desired depth of the channels 14A. In this case, the end spacers 44A, 44B can comprise a sealant with the ball spacers embedded therein to control the spacing of the plates 40, 42. In another embodiment, the physical structures 45 can comprise one or more protrusions (e.g., pillars) molded or deposited onto the internal facing surface of one or both of the plates 40, 42. Similar to the ball spacers, the protrusions can have a size that ensures a proper spacing between the plates 40, 42. When the physical structures 45 can be manufactured and placed with sufficient accuracy, the physical structures can have an arrangement that provides a tapered depth for the channels 14A as shown in FIG. 4C. While the physical structures are only shown in conjunction with spacers located at the ends of the cartridge 14, it is understood that the physical structures can be utilized any of the channels of a cartridge and/or in any spacer described herein.

As discussed herein, a cartridge can include one or more features that are configured to limit the effects of evaporation. Additionally, a cartridge can include one or more features to ensure that it is used properly, e.g., inserted into and held correctly in a stand 12 (FIG. 1). In an embodiment, a cartridge described herein includes a cap that can be configured to limit evaporation and/or ensure proper use of a cartridge described herein.

For example, the cartridge shown in FIGS. 8A and 8B is further shown including a cap 50 located at a bottom of the cartridge 14. The cap 50 can cover the bottom of the cartridge 14 and be attached thereto using any solution (e.g., an adhesive). The cap 50 can include a set of openings 52, each of which is aligned with an exit opening of a channel 14A in the cartridge 14. The opening 52 can have a significantly smaller lateral area than the lateral area of the exit opening of the channel 14A, thereby limiting a surface area exposed for evaporation. When the cap 50 contacts a bottom surface of the plates 40, 42, the cap 50 can be formed of a material that repels the corresponding liquid. Illustrative materials include polyethylene, vinyl, polypropylene, and/or the like.

Figure 9A:
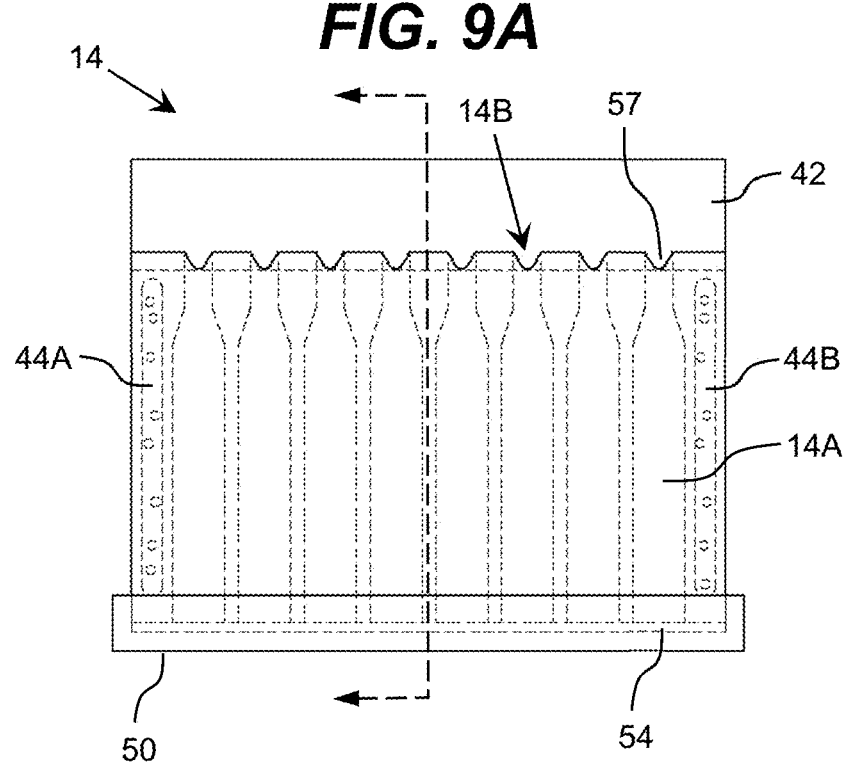
FIGS. 9A and 9B show a front view and side cross-section view of an illustrative cartridge according to another embodiment.
Figure 9B:
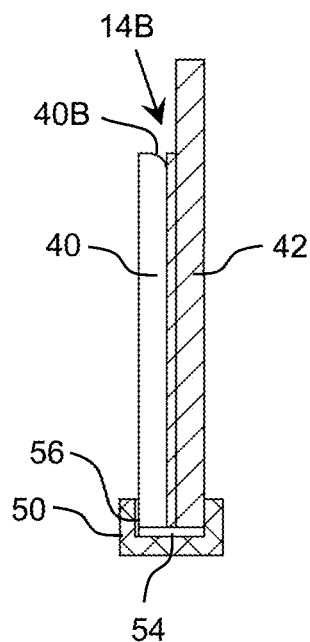

FIGS. 9A and 9B show a front view and side cross-section view of another illustrative cartridge 14 according to an embodiment. The cartridge 14 includes an alternative configuration for the cap 50. In particular, in this case, the cap 50 includes a vent gap 54 that extends along a length of the bottom surface of the plates 40, 42. The cap 50 can be formed of a repellant material and/or the vent gap 54 can have a vertical spacing that is sufficiently large (e.g., at least three times a depth of the channels in an embodiment, but can be much smaller in certain applications) to prevent the liquid from wicking out of the channel 14A. Air in the channel 14A can travel through the vent gap 54 and exit the cap 50 via one or more vertical vent grooves 56 formed therein. For example, the cap 50 can include a single vent groove 56 formed between one of the plates 40, 42 and the cap 50.

In addition to limiting evaporation, as the cap 50 creates a bottom of the cartridge 14 that differs from the top of the cartridge 14, the presence of the cap 50 can provide a physical and visual indicator for inserting the cartridge 14 into a stand 12. In this case, the stand 12 can have a complementary opening for the cartridge 14 that only allows the cartridge 14 to be inserted in the correct orientation. In an embodiment, the cap 50 can be configured to enable use of the cartridge 14 without a stand 12. For example, the cap 50 can be sufficiently wide so as to allow the cartridge 14 to be supported in a desired orientation without the aid of a stand 12.

In addition, the cartridges 14 of FIGS. 8A-8B and 9A-9B illustrate inclusion of a notch 57 adjacent to the entrance region for a channel 14A. The notch 57 can assist in aligning a dispensing spout of a liquid handling device with the entrance region for the channel 14A. As illustrated, the notch 57 can have a rounded shape, which can be sized based on one or more attributes of a dispensing spout. The notch 57 can provide a surface for positioning a dispensing spout 2A (FIG. 2A) in contact with the notch 57. When positioned in contact with the notch 57, liquid exiting the dispensing spout 2A will be in the entrance region 14B for the channel 14A. Additionally, a first plate 40 can include a notch 57 for each channel 14A, while a second plate 42 can extend beyond the entrance region for the channel 14A. Furthermore, the first plate 40 can include a tapered entrance surface 40B for the channel 14A, which can be configured to assist with the liquid entering the channel 14A.

While the cartridges described herein have been illustrated as being formed from two distinct plates, it is understood that an embodiment of a cartridge described herein can be fabricated from a single piece of material, such as drawn glass, molded or extruded plastic, 3D printed material, and/or the like. FIGS. 10A-10D show front, bottom, and two detailed views, respectively, of an illustrative cartridge formed of a single piece according to an embodiment. As illustrated, the cartridge 14 can include a plurality of channels 14A that extend there through. Each channel 14A can have a rectangular lateral cross-section which can vary in one or more dimensions and/or change directions one or more times as described herein.

Figure 10A:
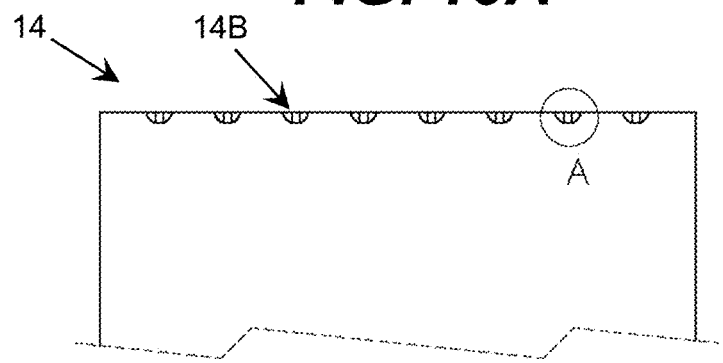
FIGS. 10A-10D show front, bottom, and two detailed views, respectively, of an illustrative cartridge formed of a single piece according to an embodiment.
Figure 10B:
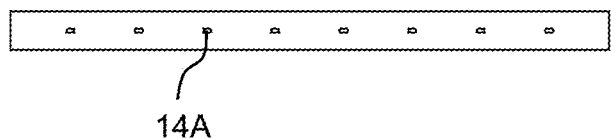
Figure 10C:
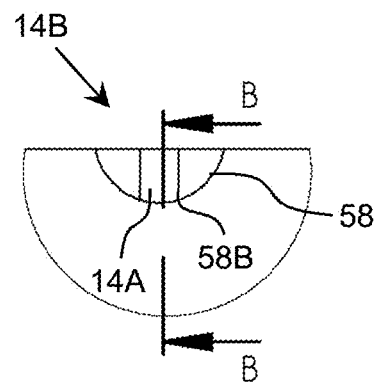
Figure 10D:
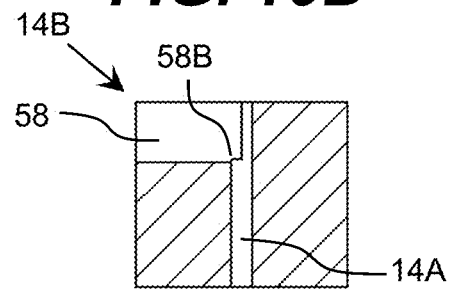

As shown in detail in FIGS. 10C and 10D, the entrance region 14B for a channel 14A can include an entrance region 14B to assist in directing a liquid handling device to an appropriate location for dispensing a liquid into the corresponding channel 14A. The entrance region 14B can comprise an entrance notch 58 having a semi-cylindrical shape that extends all the way to a side edge of the cartridge 14. An internal end of the notch 58 can have a curve that extends over the channel 14A to assist in proper placement of a dispensing spout with respect to the channel 14A. At the transition between the entrance notch 58 and the channel 14A, the surface can include a tapered entrance surface 58B, which can have a cross-sectional shape similar to that of the tapered entrance surface 40B shown in FIG. 9B. The surface of the entrance notch 58 and the tapered entrance surface 58B can have an affinity to the liquid. While the entrance notch 58 is shown and described in conjunction with an embodiment formed of a single piece of material, it is understood that embodiments of a cartridge formed from two plates can include a similarly configured entrance notch.

Figure 11:
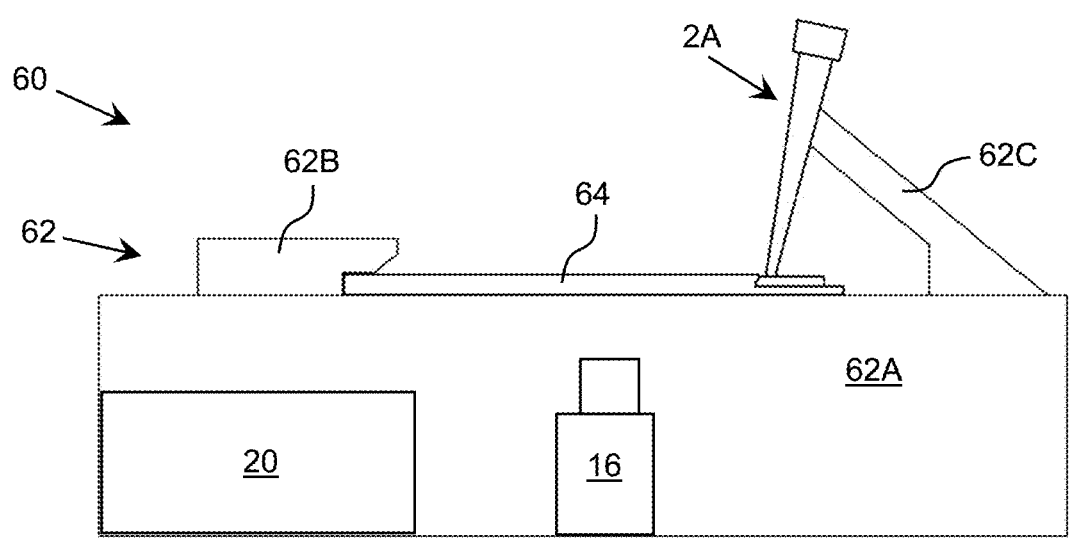
FIG. 11 shows an illustrative liquid evaluation system according to another embodiment.

As discussed herein, in addition to being configured for use when oriented in an upright position, embodiments of a cartridge described herein can be configured for use when oriented horizontally and/or in a position such that the exit opening is higher than the entrance region for a channel. To this extent, FIG. 11 shows an illustrative liquid evaluation system 60 according to another embodiment. The liquid evaluation system 60 is shown including a stand 62, which is configured to position a cartridge 64 in a desired orientation for dispensing a liquid into one or more channels located in the cartridge 64. Once the cartridge 64 has been positioned, the liquid can be dispensed into one or more channels of the cartridge 64, e.g., using a liquid handling device 2.

The stand 62 is configured to position the cartridge 64 in a desired orientation. In this case, the cartridge 64 can be positioned in a substantially horizontal orientation. As a result, each channel in the cartridge 64 can have a corresponding entrance region that is approximately on the same horizontal plane as the channel. In another embodiment, the cartridge 64 be oriented such that an exit opening of each channel is higher than the entrance region for the channel, e.g., to keep a meniscus of the liquid at the entrance of the channel.

Regardless, the stand 62 can comprise a base 62A and a guide 62B, which can enable the cartridge 64 to be positioned in a suitable approximately horizontal position for dispensing a liquid into one or more channels of the cartridge 64. To this extent, the guide 62B can include one or more mechanical stops that define an extent to which the cartridge 64 is to be inserted in two lateral directions. When the guide 62B contacts a bottom of the cartridge 64, the guide 62B can be configured to allow air to escape from the channel(s) of the cartridge 64, e.g., in a manner similar to the cap described herein.

Additionally, the stand 62 can include one or more features to assist in aligning one or more dispensing spouts 2A (e.g., pipette tips) of the liquid handling device (e.g., pipette) with one or more channels of the cartridge 64 so that the liquid can be properly dispensed from the dispensing spout(s) 2A of the liquid handling device into the channel(s) of the cartridge 64. For example, the stand 62 is shown including a mechanical guide 62C, which can comprise an arm that can assist in positioning the liquid handling device and/or the corresponding dispensing spout(s) 2A.

The system 60 can be used to evaluate one or more attributes of the liquid located in the channel(s) of the cartridge 64 using any solution. To this extent, the system 60 also is shown including an imaging device 16 and a computer system 20, each of which can be operated as described herein with respect to the system 10 shown in FIG. 1. As illustrated, the computer system 20 and imaging device 16 can be embedded within the base 62A of the stand 62. However, it is understood that this is only illustrative of various possible configurations. When the imaging device 16 is located within the base 62A, the base can be configured to enable the imaging device 16 to acquire image data of one or more regions of the cartridge 64 through a top surface of the base 62A, e.g., by having a glass region, and/or the like.

Figure 12:
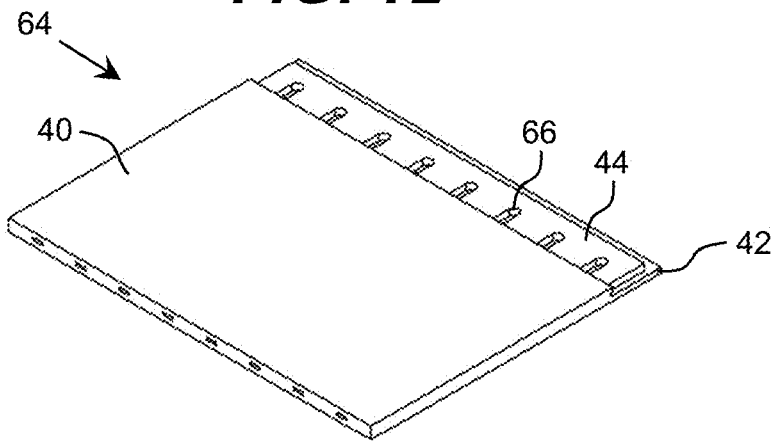
FIG. 12 shows an illustrative multichannel cartridge that can be utilized in a horizontal orientation according to an embodiment.

FIG. 12 shows an illustrative multichannel cartridge 64 that can be utilized in a horizontal orientation according to an embodiment. The cartridge 64 can comprise a pair of plates 40, 42 and a spacer structure 44 located there between, each of which can be configured as described herein. As illustrated, a first plate 42 can extend beyond the other plate 40 to expose a portion of the spacer structure 44, which can include a groove guide 66 to assist in properly positioning a dispensing spout (e.g., a pipette tip) with respect to a corresponding channel. The groove guide 66 and top plate 40 can form an entrance region for each channel. The top plate 40 can include a tapered entrance surface 40B as shown in conjunction with FIG. 9B.

Figure 13:
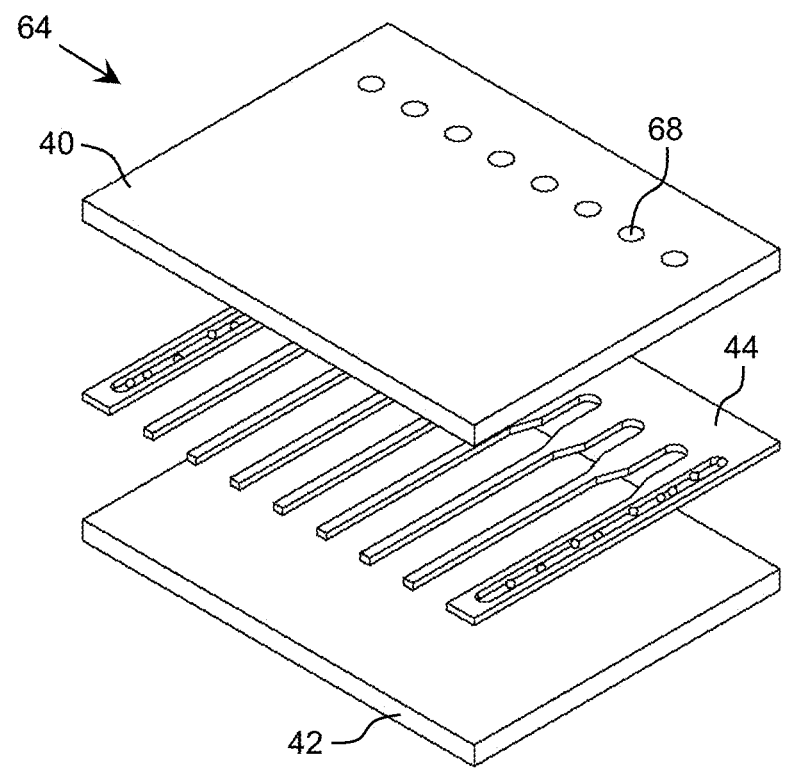
FIG. 13 shows an exploded view of an illustrative multichannel cartridge that can be utilized in a horizontal orientation according to another embodiment.

FIG. 13 shows an exploded view of an illustrative multichannel cartridge 64 that can be utilized in a horizontal orientation according to another embodiment. In this configuration, the multichannel cartridge 64 includes a top plate 40 including a plurality of openings 68, each of which aligns with a channel defined by the spacer structure 44 located between the two plates 40, 42. Liquid can be deposited into a channel through the corresponding opening 68. The opening can be located anywhere along the channel, such as at a location at an end of the channel or a location away from both ends of the channel. Each opening 68 can have a tapered entrance surface, which can be configured similar to the tapered entrance surface 40B shown in FIG. 9B to facilitate the flow of the liquid into the corresponding channel.

While shown and described herein as a liquid evaluation system, it is understood that aspects of the invention further provide various alternative embodiments. For example, in one embodiment, the invention provides a process for evaluating one or more of an accuracy of a single or multichannel liquid handling device (e.g., a pipette), an accuracy of a liquid handling device operator (human or robotic), using a system described herein. Such a process can include dispensing a liquid for use in the evaluation into one or more channels of a cartridge described herein and measuring an accuracy of the dispensed liquid. This process can be repeated one or more times using different cartridges and/or different channels in a cartridge. The measurement can be performed by a computer system using image data acquired of the cartridge and/or performed by a human.

In another embodiment, the invention provides a process for evaluating one or more attributes of a volume of liquid dispensed into a channel of a cartridge described herein. The liquid can comprise a sample, a treated sample, and/or the like, for which data regarding one or more of a color or a clarity, can be correlated with one or more other attributes of the volume of liquid. In this case, multiple samples and/or one or more control samples can be placed in distinct channels of a cartridge described herein and compared concurrently. Additionally, controlled ambient conditions, such as lighting, temperature, ventilation, and/or the like, can provide suitable data for comparing different samples imaged at different times. Data regarding one or more of the ambient conditions can be used to normalize samples acquired and imaged at different times for proper comparison.

As used herein, unless otherwise noted, the term "set" means one or more (i.e., at least one) and the phrase "any solution" means any now known or later developed solution. The singular forms "a," "an," and "the" include the plural forms as well, unless the context clearly indicates otherwise. Additionally, the terms "comprises," "includes," "has," and related forms of each, when used in this specification, specify the presence of stated features, but do not preclude the presence or addition of one or more other features and/or groups thereof.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to an individual in the art are included within the scope of the invention as defined by the accompanying claims.

What is claimed is:

1. A liquid evaluation system comprising:
  a cartridge including a channel for holding liquid, the cartridge including:
    a first plate including a first region of an internal facing surface forming a first side of the channel and a first side of an entrance region for the channel; and
    a second plate including a second region of an internal facing surface forming a second side of the channel and a second side of the entrance region for the channel, wherein the first region and the second region are configured to have an affinity for the liquid, and wherein a separation between the first plate and the second plate causes the liquid to be pulled into the entrance region for the channel and the channel by capillary action, wherein at least one of: a proximal end of the first plate or a proximal end of the second plate, includes a tapered entrance surface forming at least a portion of the entrance region located between the first and second plates, wherein the entrance region includes an opening located at the at least one of: the proximal end of the first plate or the proximal end of the second plate, to enable liquid to be dispensed therein, and wherein the tapered entrance surface is configured to provide a smooth transition for the liquid to flow from the entrance region into the channel, and
    wherein at least a portion of a lateral extent of the channel and/or the entrance region for the channel, is defined by a surface treatment located on at least one of the internal facing surface of the first plate or the internal facing surface of the second plate, wherein the surface treatment prevents the liquid from spreading outside the channel and/or the entrance region for the channel, and wherein a gap is present between the internal facing surface of the first plate and the internal facing surface of the second plate in a barrier region located immediately adjacent to the portion of the channel and/or the entrance region for the channel having the lateral extent defined by the surface treatment.

2. The system of claim 1, wherein the proximal end of the first plate and the proximal end of the second plate are aligned, and wherein the opening is located between the proximal end of the first plate and the proximal end of the second plate.

3. The system of claim 1, wherein the entrance region for the channel has a larger depth than a depth for the channel at an entrance of the channel located immediately adjacent to the entrance region for the channel.

4. The system of claim 1, wherein one of: the first plate or the second plate, extends further than the other of: the first plate or the second plate, beyond the entrance region for the channel located between the first plate and the second plate, to assist with dispensing the liquid, and wherein the entrance region for the channel extends into a defined area of the one of: the first plate or the second plate, wherein the defined area is located further than the other of: the first plate or the second plate.

5. The system of claim 1, wherein at least one of: the first plate or the second plate, includes a set of markings corresponding to at least one volume of the liquid held in the channel.

6. The system of claim 1, wherein the first region of the internal facing surface of the first plate includes a coating configured to have an affinity for the liquid.

7. The system of claim 1, wherein at least a portion of a lateral extent of at least one of: the channel or the entrance region for the channel, is defined by a spacer, wherein the spacer physically contacts at least one of: the first plate or the second plate.

8. The system of claim 1, wherein the surface treatment comprises a coating applied to the at least one of the internal facing surface of the first plate or the internal facing surface of the second plate, wherein the coating is configured to be repellant to the liquid.

9. The system of claim 1, wherein the surface treatment comprises at least one of: a groove formed in the internal facing surface of the first plate or a groove formed in the internal facing surface of the second plate.

10. The system of claim 1, wherein the cartridge further includes a plurality of physical structures located along a height between the first plate and the second plate, wherein each of the plurality of physical structures has a size corresponding to a desired spacing between the first plate and the second plate at the location of the physical structure.

11. The system of claim 10, wherein the plurality of physical structures comprise a plurality of ball spacers.

12. The system of claim 10, wherein the plurality of physical structures comprise protrusions from at least one of: the internal facing surface of the first plate or the internal facing surface of the second plate.

13. A liquid evaluation system comprising:
a cartridge including a set of channels for holding liquid, the cartridge including:
a first plate including an internal facing surface forming a first side of each channel in the set of channels and a first side of an entrance region for each channel in the set of channels, wherein the first plate has a tapered entrance surface on the internal facing surface forming at least a portion of the entrance region located between the first and second plates for each channel in the set of channels, wherein the tapered entrance surface is configured to provide a smooth transition for the liquid to flow from the entrance region into the channel; and
a second plate including an internal facing surface forming a second side of each channel in the set of channels and a second side of the entrance region for each channel in the set of channels, wherein a separation between the first plate and the second plate causes the liquid to be pulled into a corresponding entrance region for a channel and the channel by capillary action,
wherein a proximal end of the first plate and a proximal end of the second plate are aligned, and wherein the entrance region for each channel in the set of channels includes an opening located between the proximal end of the first plate and the proximal end of the second plate to enable liquid to be dispensed therein.

14. The system of claim 13, wherein, for each channel in the set of channels, at least a portion of a lateral extent of the channel and/or the entrance region for the channel, is defined by a surface treatment located on at least one of the internal facing surface of the first plate or the internal facing surface of the second plate, wherein the surface treatment prevents the liquid from spreading outside the channel and/or the entrance region for the channel, and wherein a gap is present between the internal facing surface of the first plate and the internal facing surface of the second plate in a barrier region located immediately adjacent to the portion of the channel and/or the entrance region for the channel having the lateral extent defined by the surface treatment.

15. The system of claim 13, the cartridge further including a set of spacers located between the first plate and the second plate, wherein each spacer in the set of spacers defines a lateral extent of at least one of: a channel in the set of channels or an entrance region for a channel in the set of channels.

16. The system of claim 13, wherein a lateral extent of at least one of: a channel in the set of channels or an entrance region for a channel in the set of channels, is at least partially defined by a repellant region of the internal facing surface of at least one of: the first plate or the second plate.

17. The system of claim 13, further comprising means for positioning the cartridge such that the set of channels is in a substantially vertical orientation for dispensing the liquid into the opening of the entrance region.

18. A liquid evaluation system comprising:
a cartridge including a plurality of channels for holding liquid, the cartridge including:
a first plate including an internal facing surface forming a first side of each channel in the plurality of channels and a first side of an entrance region for each channel in the plurality of channels, wherein the first plate has a tapered entrance surface on the internal facing surface forming at least a portion of the entrance region located between the first and second plates for each channel in the plurality of channels, wherein the tapered entrance surface is configured to provide a smooth transition for the liquid to flow from the entrance region into the channel; and a second plate including an internal facing surface forming a second side of each channel in the plurality of channels and a second side of the entrance region for each channel in the plurality of channels, wherein a separation between the first plate and the second plate causes the liquid to be pulled into a corresponding entrance region for a channel and the channel by capillary action, wherein a proximal end of the first plate and a proximal end of the second plate are aligned, and wherein the entrance region for each channel in the plurality of channels includes an opening located between the proximal end of the first plate and the proximal end of the second plate to enable liquid to be dispensed therein, and wherein, for two adjacent channels in the plurality of channels, at least a portion of a lateral extent of an area between the adjacent channels is defined by a surface treatment located on at least one of the internal facing surface of the first plate or the internal facing surface of the second plate, wherein the surface treatment prevents the liquid from spreading outside the adjacent channels, and wherein a gap is present between the internal facing surface of the first plate and the internal facing surface of the second plate in the area between the adjacent channels having the lateral extent defined by the surface treatment.

19. The system of claim 18, further comprising an imaging device configured to acquire image data of the channel.

20. The system of claim 19, further comprising a computer system for receiving and storing image data of the channel.

* * * * *